United States Patent
Zhang et al.

(10) Patent No.: US 11,696,333 B2
(45) Date of Patent: Jul. 4, 2023

(54) BEAM SWEEP BASED RANDOM ACCESS MSG 1 AND MSG 2

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Mostafa Khoshnevisan, San Diego, CA (US); Junyi Li, Chester, NJ (US); Tianyang Bai, Somerville, NJ (US); Kiran Venugopal, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/091,352

(22) Filed: Nov. 6, 2020

(65) Prior Publication Data
US 2021/0195650 A1  Jun. 24, 2021

Related U.S. Application Data

(60) Provisional application No. 62/951,894, filed on Dec. 20, 2019.

(51) Int. Cl.
*H04W 74/08* (2009.01)
*H04W 74/00* (2009.01)
(Continued)

(52) U.S. Cl.
CPC ...... *H04W 74/0833* (2013.01); *H04B 7/0695* (2013.01); *H04W 72/046* (2013.01);
(Continued)

(58) Field of Classification Search
CPC ........... H04W 74/0833; H04W 74/008; H04W 16/28; H04W 72/046; H04W 72/0446;
(Continued)

(56) References Cited

U.S. PATENT DOCUMENTS

2013/0182680 A1  7/2013  Choi et al.
2013/0286960 A1  10/2013  Li et al.
(Continued)

FOREIGN PATENT DOCUMENTS

WO  2018084663 A1  5/2018
WO  2020164442 A1  8/2020

OTHER PUBLICATIONS

Qualcomm Incorporated: "Beam Aware RACH Procedure and Beam Refinement During Handover", 3GPP Draft, 3GPP TSG-RAN WG2 Meeting #99, R2-1709091, 3rd Generation Partnership Project (3GPP), Mobile Competence Centre, 650, Route Des Lucioles, F-06921 Sophia-Antipolis Cedex, France Aug. 25, 2017 (Aug. 25, 2017), XP051318883, pp. 1-7, Retrieved from the Internet: URL:http://www.3gpp.org/ftp/Meetings_3GPP_SYNC/RAN2/Docs/section 2.
(Continued)

*Primary Examiner* — Kevin C. Harper
(74) *Attorney, Agent, or Firm* — Procopio, Cory, Hargreaves & Savitch LLP

(57) ABSTRACT

A method, a computer-readable medium, and an apparatus are provided for wireless communication including random access between a base station and a user equipment (UE). The UE transmits at least two first random access messages (Msg 1) to multiple transmission reception points (TRPs) of at least one cell using different resources for the multiple TRPs. The UE monitors for at least two second random access messages (Msg 2) from the multiple TRPs of the at least one cell using different resources for the multiple TRPs.

30 Claims, 15 Drawing Sheets

(51) Int. Cl.
*H04W 72/044* (2023.01)
*H04W 72/0446* (2023.01)
*H04W 72/0453* (2023.01)
*H04B 7/06* (2006.01)
*H04W 72/23* (2023.01)
*H04W 16/28* (2009.01)
*H04W 76/27* (2018.01)
*H04W 72/1263* (2023.01)
*H04W 56/00* (2009.01)
*H04L 5/00* (2006.01)

(52) U.S. Cl.
CPC ... *H04W 72/0446* (2013.01); *H04W 72/0453* (2013.01); *H04W 72/23* (2023.01); *H04W 74/008* (2013.01); *H04B 7/0626* (2013.01); *H04L 5/0051* (2013.01); *H04W 16/28* (2013.01); *H04W 56/001* (2013.01); *H04W 72/1263* (2013.01); *H04W 76/27* (2018.02)

(58) Field of Classification Search
CPC ............... H04W 76/27; H04W 72/042; H04W 72/1263; H04W 56/001; H04W 72/0453; H04L 5/005; H04B 7/0695
See application file for complete search history.

(56) References Cited

U.S. PATENT DOCUMENTS

| | | |
|---|---|---|
| 2017/0195033 A1 | 7/2017 | Zhang et al. |
| 2017/0231011 A1 | 8/2017 | Park et al. |
| 2018/0020487 A1 | 1/2018 | Tsai et al. |
| 2018/0070380 A1 | 3/2018 | Nagaraja et al. |
| 2018/0092129 A1 | 3/2018 | Guo et al. |
| 2018/0124837 A1 | 5/2018 | Yu et al. |
| 2018/0167979 A1* | 6/2018 | Guo ................... H04W 74/0833 |
| 2018/0235013 A1* | 8/2018 | Jung ................... H04W 74/006 |
| 2018/0279380 A1* | 9/2018 | Jung ................... H04W 56/0005 |
| 2019/0029036 A1 | 1/2019 | John Wilson et al. |
| 2019/0037426 A1* | 1/2019 | Yu ....................... H04W 72/046 |
| 2019/0075600 A1 | 3/2019 | Kwon et al. |
| 2019/0174346 A1 | 6/2019 | Murray et al. |
| 2019/0182870 A1 | 6/2019 | Shih et al. |
| 2019/0215220 A1 | 7/2019 | Islam et al. |
| 2019/0215896 A1 | 7/2019 | Zhou et al. |
| 2019/0319833 A1 | 10/2019 | Nagaraja et al. |
| 2019/0327767 A1 | 10/2019 | Islam et al. |
| 2019/0349854 A1 | 11/2019 | Nagaraja et al. |
| 2019/0357263 A1 | 11/2019 | Yuan et al. |
| 2019/0380139 A1* | 12/2019 | Xiong ............... H04W 72/1268 |
| 2020/0015273 A1 | 1/2020 | Zhang et al. |
| 2020/0053607 A1 | 2/2020 | Ingale et al. |
| 2020/0136708 A1 | 4/2020 | Pan et al. |
| 2020/0137806 A1 | 4/2020 | Islam et al. |
| 2020/0145079 A1 | 5/2020 | Marinier et al. |
| 2020/0296635 A1 | 9/2020 | Rastegardoost et al. |
| 2020/0314913 A1* | 10/2020 | Rastegardoost ...... H04W 74/04 |
| 2021/0050968 A1* | 2/2021 | Yi ......................... H04L 5/0048 |
| 2021/0058285 A1* | 2/2021 | Wu ....................... H04B 7/088 |
| 2021/0160923 A1 | 5/2021 | Zhang et al. |
| 2021/0195651 A1 | 6/2021 | Zhang et al. |
| 2021/0306865 A1 | 9/2021 | Zhang et al. |
| 2021/0410187 A1 | 12/2021 | Yang et al. |
| 2022/0167279 A1* | 5/2022 | Zhou ................... H04W 52/146 |

OTHER PUBLICATIONS

International Search Report and Written Opinion—PCT/US2020/059690—ISA/EPO—dated May 27, 2021.
Partial International Search Report—PCT/US2020/059690—ISA/EPO—dated Feb. 28, 2021.

* cited by examiner

BEAM SWEEP BASED RANDOM ACCESS MSG 1 AND MSG 2

CROSS REFERENCE TO RELATED APPLICATION(S)

This application claims the benefit of U.S. Provisional Application Ser. No. 62/951,894, entitled "Beam Sweep Based Random Access Msg 1 and Msg 2" and filed on Dec. 20, 2019, which is expressly incorporated by reference herein in its entirety.

BACKGROUND

Technical Field

The present disclosure relates generally to communication systems, and more particularly, to wireless communication including random access.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus transmits at least two first random access messages (Msg 1) to multiple transmission reception points (TRPs) of at least one cell using different resources for the multiple TRPs. The apparatus monitors for at least two second random access messages (Msg 2) from the multiple TRPs of the at least one cell using different resources for the multiple TRPs.

In an aspect of the disclosure, a method, a computer-readable medium, and an apparatus are provided for wireless communication at a base station. The apparatus receives, from a UE, at least two first random access messages (Msg 1) at multiple TRPs of at least one cell based on different resources for the multiple TRPs. The apparatus transmits, to the UE, at least two second random access messages (Msg 2) from the multiple TRPs of the at least one cell based on the different resources for the multiple TRPs.

To the accomplishment of the foregoing and related ends, the one or more aspects comprise the features hereinafter fully described and particularly pointed out in the claims. The following description and the annexed drawings set forth illustrative features of the one or more aspects. These features are indicative, however, of but a few of the various ways in which the principles of various aspects may be employed, and this description is intended to include all such aspects and their equivalents.

DETAILED DESCRIPTION

Figure 1:
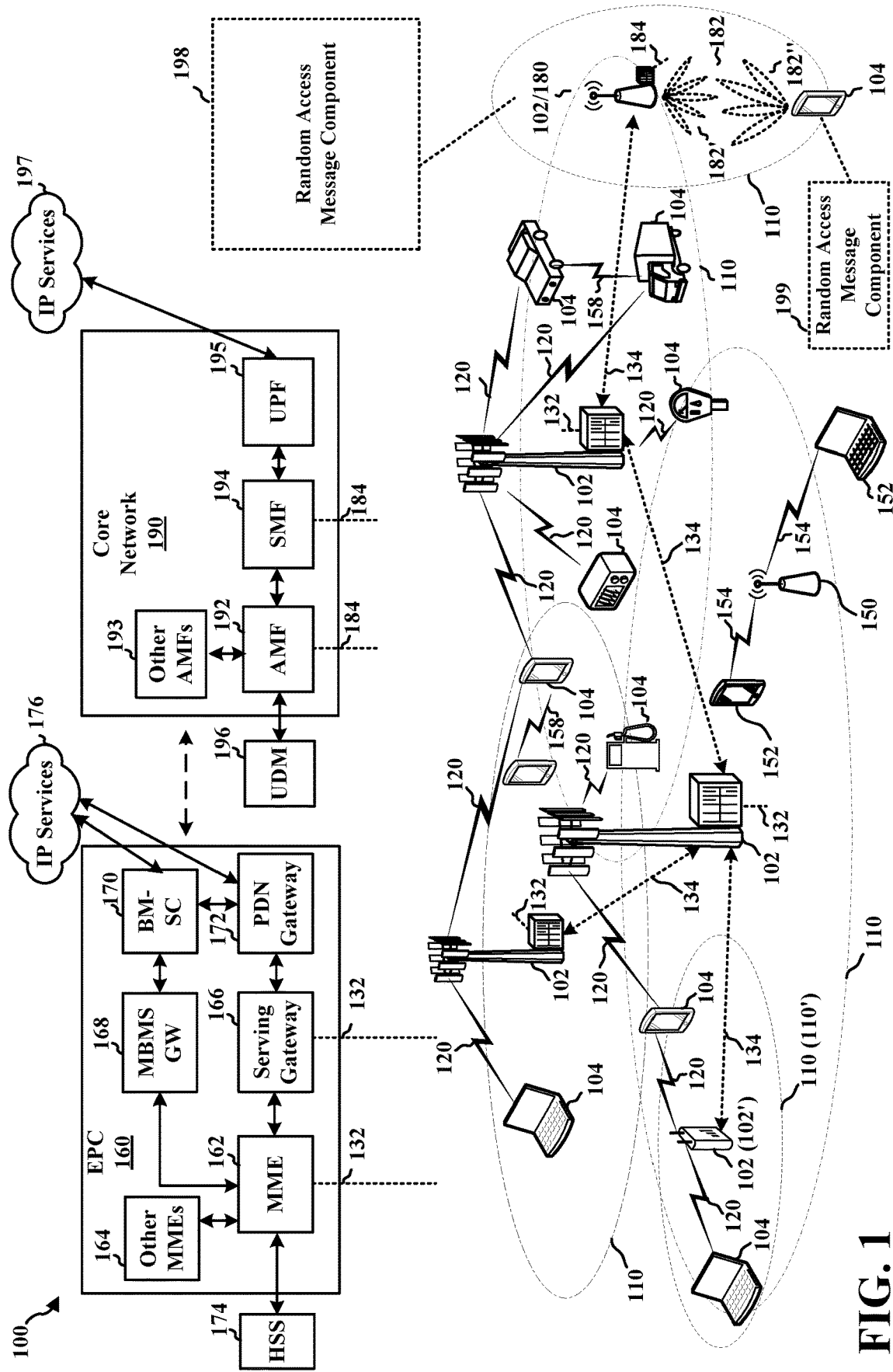
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In order to perform a random access procedure with a cell, a UE may identify a directional beam. The UE may exchange random access messages with the base station, e.g., Msg 2, Msg 3, and Msg 4, using the beam identified by the UE. After completing the random access procedure, the UE and the base station may transition to a refined beam operation in which the UE may measure CSI-RS on different beams from the base station and may provide measurement reports to the base station for beam selection.

Aspects presented herein may provide coverage and/or latency improvements for random access. Aspects presented herein may help to increase the reliability of transmissions by providing multiple transmission opportunities in the time, frequency, and/or spatial domain for random access transmissions or a random access channel (RACH). The additional transmission opportunities may improve the reliability of communication, e.g., in the unlicensed spectrum, by increasing a likelihood of successful random access procedures between a UE and a cell. The increased reliability may help to support services such as URLLC services, IoT such as Industrial IoT (IIoT) services, NR based communication in an unlicensed spectrum (such as FR1) in a controlled environment, among others. Aspects may provide increased random access reliability and robustness through the use of beam sweeping during random access between a UE and multiple TRPs associated with at least one base station.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). A UE 104 may include a random access message component 199 configured to transmit at least two first random access messages (Msg 1) to multiple TRPs of at least one cell using different resources for the multiple TRPs. The apparatus monitors for at least two second random access messages (Msg 2) from the multiple TRPs of the at least one cell using different resources for the multiple TRPs. A base station 102 or 180 may include a random access message component 198 configured to receive, from a UE 104, at least two first random access messages (Msg 1) at multiple TRPs of at least one cell based on different resources for the multiple TRPs. The apparatus transmits, to the UE 104, at least two second random access messages (Msg 2) from the multiple TRPs of the at least one cell based on the different resources for the multiple TRPs.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
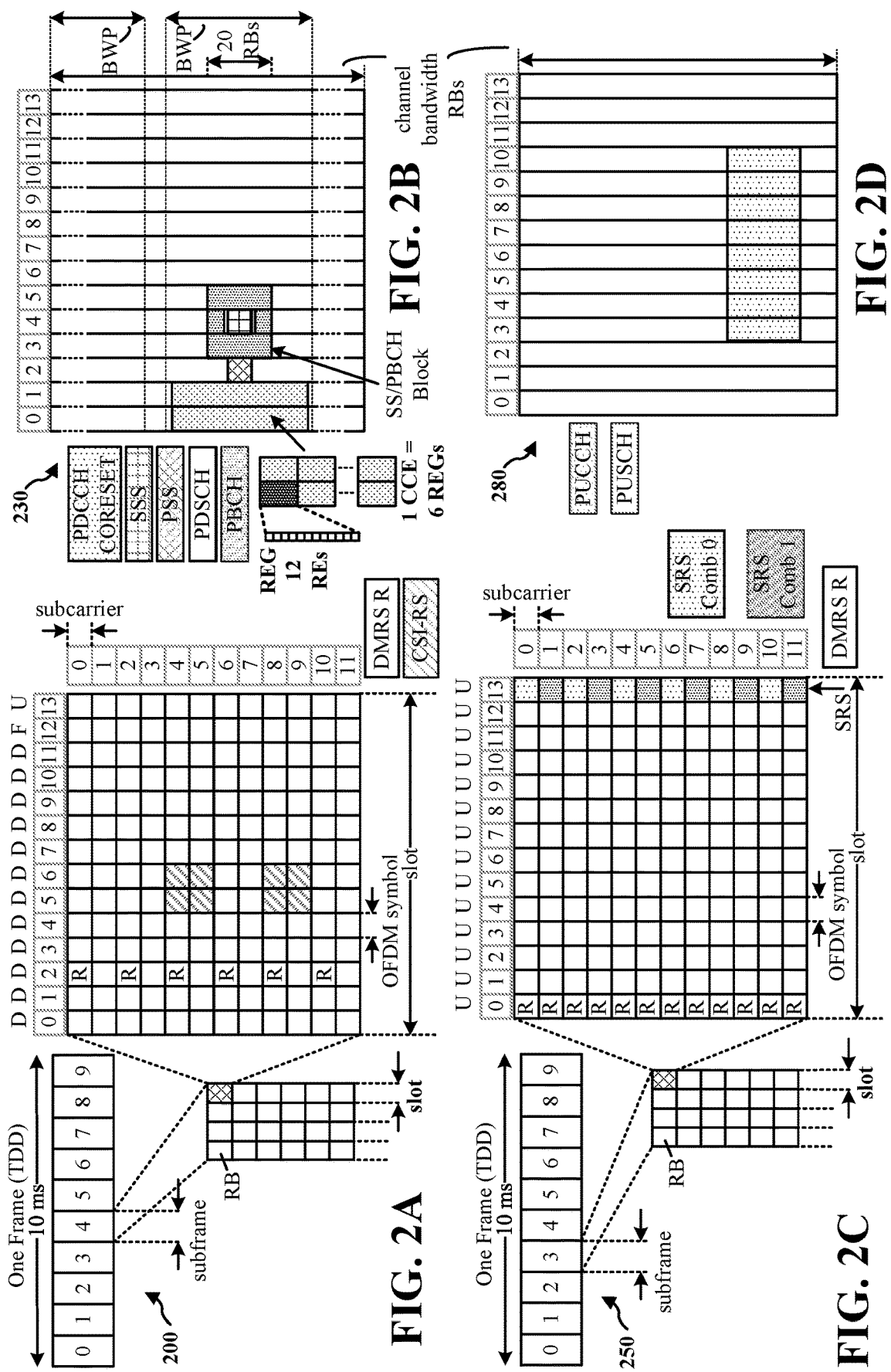
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu * 15$ kHz, where µ is the numerology 0 to 4. As such, the numerology µ=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
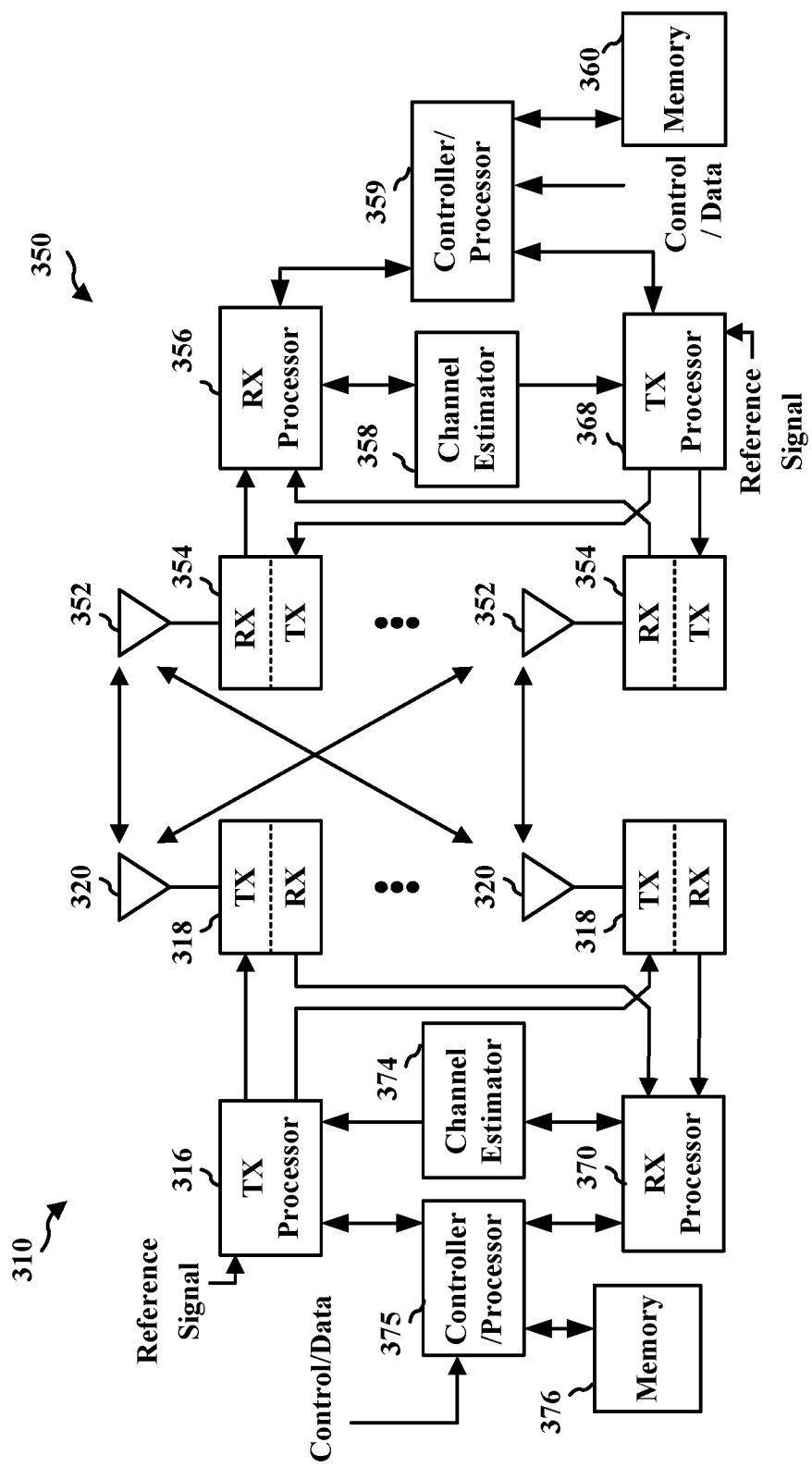
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the random access message component 199 of FIG. 1.

At least one of the TX processor 316, the RX processor 370, and the controller/processor 375 may be configured to perform aspects in connection with the random access message component 198 of FIG. 1.

Figure 4:
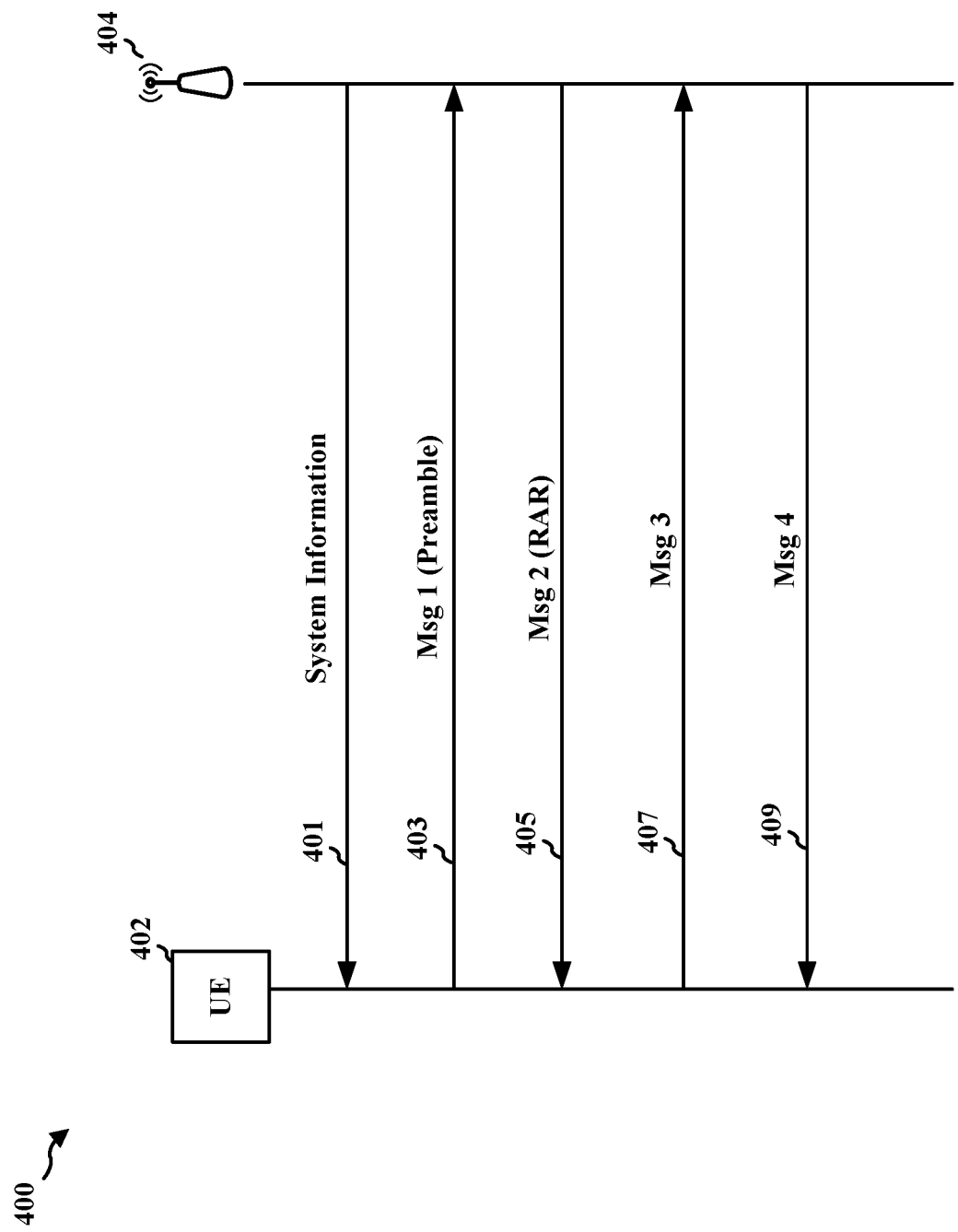
FIG. 4 illustrates a communication flow between a UE and a base station including a random access procedure.

A UE may use a random access procedure in order to communicate with a base station. For example, the UE may use the random access procedure to request an RRC connection, to re-establish an RRC connection, resume an RRC connection, etc. FIG. 4 illustrates example aspects of a random access procedure 400 between a UE 402 and a base station 404. The UE 402 may initiate the random access message exchange by sending, to the base station 404, a first random access message 403 (e.g., Msg 1) including a preamble. Prior to sending the first random access message 403, the UE may obtain random access parameters, e.g., including preamble format parameters, time and frequency resources, parameters for determining root sequences and/or cyclic shifts for a random access preamble, etc., e.g., in system information 401 from the base station 404. The preamble may be transmitted with an identifier, such as a Random Access RNTI (RA-RNTI). The UE 402 may randomly select a random access preamble sequence, e.g., from a set of preamble sequences. In some examples, a preamble sequence may be assigned to the UE 402.

The base station responds to the first random access message 403 by sending a second random access message 405 (e.g. Msg 2) using PDSCH and including a random access response (RAR). The RAR may include, e.g., an identifier of the random access preamble sent by the UE, a time advance (TA), an uplink grant for the UE to transmit data, cell radio network temporary identifier (C-RNTI) or other identifier, and/or a back-off indicator. Upon receiving the RAR 405, the UE 402 may transmit a third random access message 407 (e.g., Msg 3) to the base station 404, e.g., using PUSCH, that may include a RRC connection request, an RRC connection re-establishment request, or an RRC connection resume request, depending on the trigger for the initiating the random access procedure. The base station 404 may then complete the random access procedure by sending a fourth random access message 409 (e.g., Msg 4) to the UE 402, e.g., using PDCCH for scheduling and PDSCH for the message. The fourth random access message 409 may include a random access response message that includes timing advancement information, contention resolution information, and/or RRC connection setup information. The UE 402 may monitor for PDCCH, e.g., with the C-RNTI. If the PDCCH is successfully decoded, the UE 402 may also decode PDSCH. The UE 402 may send HARQ feedback for any data carried in the fourth random access message. The fourth message may be referred to as a contention resolution message. The fourth random access message 409 may complete the random access procedure. Thus, the UE 402 may then transmit uplink communication and/or receive downlink communication with the base station 404 based on the RAR and the fourth random access message 409.

Figure 5:
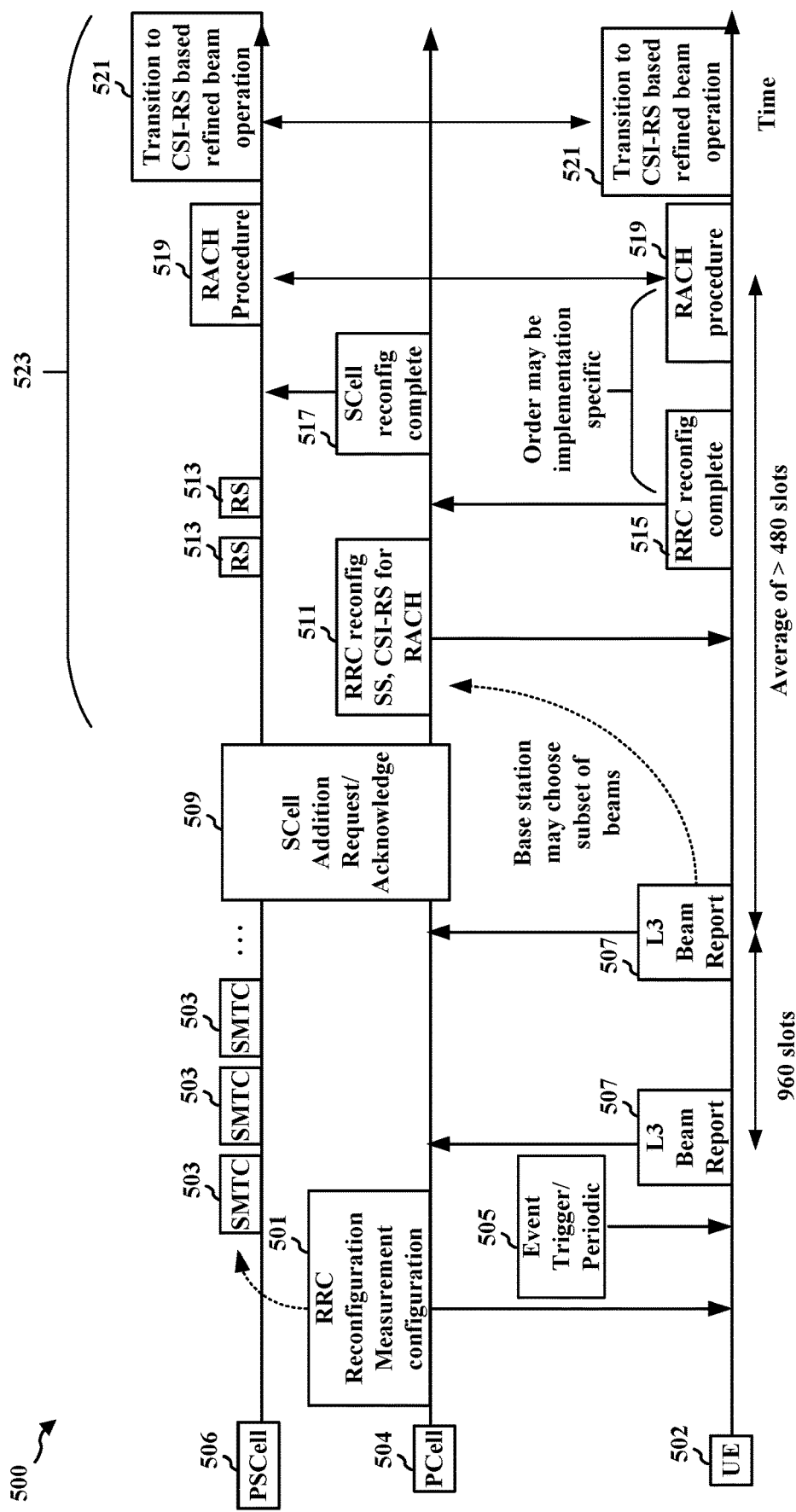
FIG. 5 illustrates an example of communication for a UE to perform random access with a primary secondary cell (PSCell).

FIG. 5 illustrates an example communication flow 500 including a UE 502 performing a random access procedure with a secondary cell 506, such as a PSCell based on a configuration that is received from a PCell 504 serving the UE 502. As illustrated in FIG. 5, the PCell 504 may configure the UE 502, at 501, to perform Layer 3 (L3) measurements on another cell, such as a PSCell 506. A PSCell is a cell that belongs to a secondary cell group (SCG). An SCF may have a PSCell and one or more secondary secondary cell (SSCell). Although aspects are illustrated for a PSCell, the aspects may be applied to an SCell. The UE 502 may use the configuration 501 that is received from the PCell 504 to measure synchronization signals from the PSCell 506. The UE may perform the measurements in corresponding SS/PBCH Block Measurement Time Configuration (SMTC) windows 503. The SMTC windows 503 may be configured by the PCell 504, e.g., by configuration 501. FIG. 2B illustrates an example SS/PBCH block. After performing the L3 measurement on the PSCell's SSBs, the UE 502 may transmit a beam report 507 about the PSCell 506 to the PCell 504. The UE 502 may provide the beam report 507 to the PCell 504 in response to an event trigger 505. In another example, the beam report 507 may be a periodic report, and the UE 502 may provide the beam report 507 to the PCell 504 in a periodic manner.

The PCell 504 may use the L3 beam report 507 about the PSCell 506, as received from the UE 502, to initiate a PSCell addition procedure 509 for the UE 502. The PCell 504 may transmit a PSCell RACH configuration 511 to the UE 502. The UE 502 may indicate to the PCell 504 that the RRC reconfiguration is complete, at 515, and the PCell 504 may indicate to the PSCell 506 that the PSCell reconfiguration is complete, at 517. The UE 502 may identify a best downlink RS beam for the PSCell 506, e.g., based on RS 513, and may use the identified beam to perform a random access procedure 519 with the PSCell 506. For example, the UE 502 may transmit a first random access message (e.g., a Msg 1 403) to the PSCell 506 during a corresponding RACH occasion. Following transmission of the Msg 1, the PSCell 506 and the UE 502 may exchange Msg 2 (e.g., 405), Msg 3 (e.g., 407), and Msg 4 (e.g., 409) of a random access procedure 519. The random access messages of the random access procedure 519, e.g., Msg 2, Msg 3, and Msg 4, may be exchanged between the UE 502 and the PSCell 506 using the same beam as the Msg 1. Msg 1, Msg 2, Msg 3, and Msg 4 may include aspects described in connection with the random access messages described in connection with FIG. 4. After completing the random access procedure 519, the UE 502 and the PSCell 506 may transition to a CSI-RS based refined beam operation 521. The UE 502 may measure CSI-RS on different beams from the PSCell 506 and may provide measurement reports to the PSCell 506 for beam selection.

Figure 6:
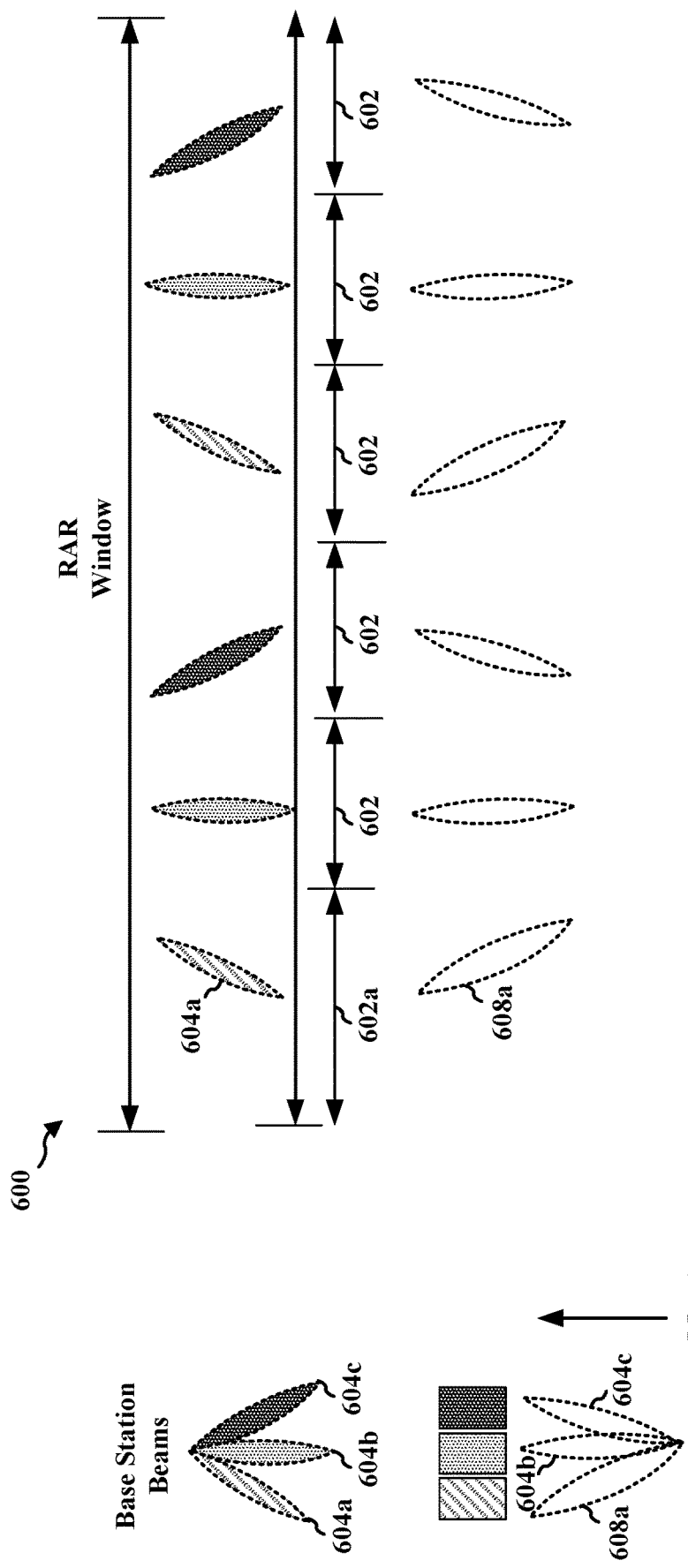
FIG. 6 illustrates an example of beam use in connection with random access.

FIG. 6 illustrates an example of RAR window 600 for multiple Msg 1 transmissions, e.g., during portions 602 of the RAR window 600, such as a window of time for receiving a RAR or Msg 2. A UE with beam correspondence may obtain multi-beam diversity during a random access transmission by transmitting multiple Msg 1 transmissions, each Msg 1 transmission using a different beam. The beams, e.g., 604a, 604b, and 604c, may correspond to different SSBs or to different CSI-RS. FIG. 6 illustrates a correspondence between the UE beams 608a, 608b, and 608c and the base station beams for the reference signals. For example, beam 608a may correspond to a reference signal for beam 604a, beam 608b may correspond to a reference signal for beam 604b, and 608c may correspond to a reference signal for beam 604c. The UE may transmit the Msg 1 multiple times using different beams. With beam correspondence, the uplink transmission beam may be the same as the downlink reception beam for the UE. The UE may perform an uplink beam sweep and may select the uplink transmission beams for the Msg 1 beam sweep. In some examples, the UE with beam correspondence may have full flexibility to use any uplink transmission beam (e.g., beam 608a, 608b, 608c) to transmit multiple Msg 1 random access transmissions corresponding to different SSBs/CSI-RS. The RAR window 600 may be interleaved for the different transmission beams. As illustrated, the UE may use portions of the RAR window to monitor for a Msg 2 from the base station using different reception beams, e.g., beam 608a, 608b, 608c. The UE and the base station may be synchronized in order for the base station to determine the beam that the UE will use a particular beam to monitor for a Msg 2 within different portions 602 of the RAR window. For example, during a particular portion 602a of the RAR window 600, the base station may determine that the UE will use a reception beam 608a corresponding to the reference signal for transmitting beam 604a. The base station may use beam 604a to transmit the Msg 2 during portion 602a. The base station may transmit the Msg 2 multiple times, e.g., transmitting the RAR using different beams during different portions 602 of the RAR window 600.

Aspects presented herein may provide coverage and/or latency improvements during the period of time 523 in the example in FIG. 5. Aspects presented herein may help to increase the reliability of transmissions by providing multiple transmission opportunities in the time and/or frequency domain for uplink transmissions or channels, such as random access transmissions or a random access channel (RACH). The additional transmission opportunities may improve the reliability of communication, e.g., in the unlicensed spectrum, by increasing a likelihood of successful random access procedures between a UE and a base station, e.g., a secondary cell such as a PSCell. The increased reliability may help to support services such as URLLC services, IoT such as Industrial IoT (IIoT) services, NR based communication in an unlicensed spectrum (such as FR1) in a controlled environment, among others.

The present disclosure provides increased random access reliability and robustness through the use of beam sweeping during random access between a UE and a base station. Aspects may be applied for random access with a PCell, an SCell, a PSCell, etc. For example, aspects may be applied for random access with a secondary cell, e.g., for new radio dual connectivity (NR-DC) in which a UE is connected to a PCell and an SCell, such as described in connection with FIG. 5.

A UE may exchange Msg 1 and/or Msg 2 during random access with a cell using beam sweeping, such as described in connection with FIG. 6. The UE may exchange the random access messages with a single transmission reception point (TRP) or with multiple TRPs of a serving cell. In some aspects, the random access procedure may include simultaneous transmission/reception. In other aspects, the random access procedure may not include simultaneous transmission/reception. For example, transmission and reception may be based on TDM rather than being simultaneous. As presented herein, candidate beam pools may be provided for random access. A beam pool index may be used to avoid potential beam pairing misalignment, which may occur for a single TRP or for multiple TRPs. When the random access involves multiple TRPs, different pool indexes may help the UE to select random access beams from the different TRPs having a large angle of departure, which may help improve uplink interference diversity. As well, for multiple TRPs, the use of a beam pool index may help balance a load of the TRPs. For example, a TRP with less urgent traffic may be selected for the exchange of random access Msg 1 and/or Msg 2. As well, joint random access across beam sweeps may improve reliability and reduce latency by enabling random access to be successfully completed even if some of the messages are not accurately received. The beam sweeping during random access may help to avoid blockages during the initial access procedure with the cell. The added transmissions of the beams sweep may help to avoid failure due to a burst of uplink or downlink inter-cell interference. For example, the random access using beam sweeping for Msg 1/Msg 2 may reduce random access latency and provide for a faster PSCell set up procedure having reduced failures or retransmissions.

Figure 7A:
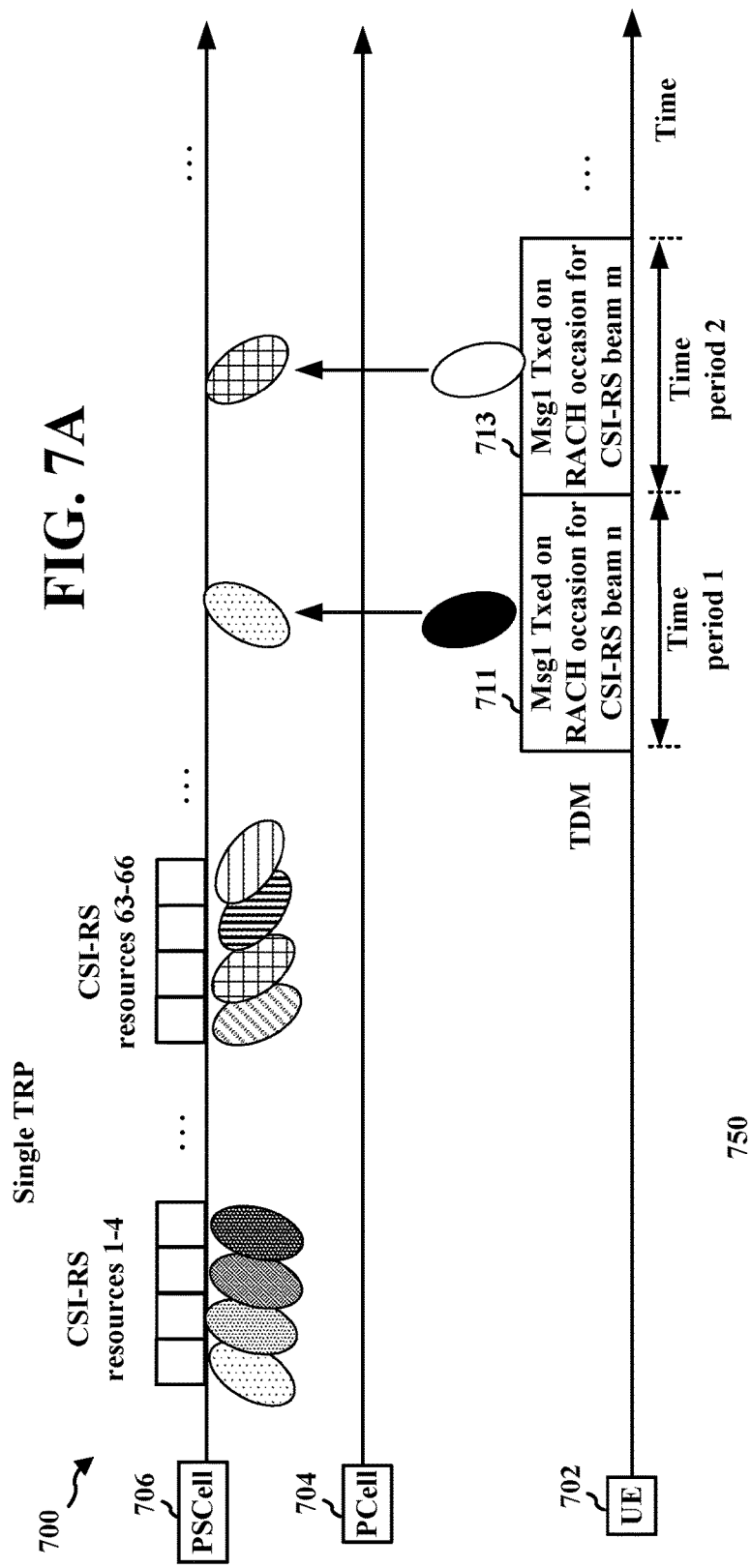
FIGS. 7A and 7B illustrate example aspects of random access between a UE and a cell having a single transmission reception point (TRP) using multiple beams.
Figure 7B:
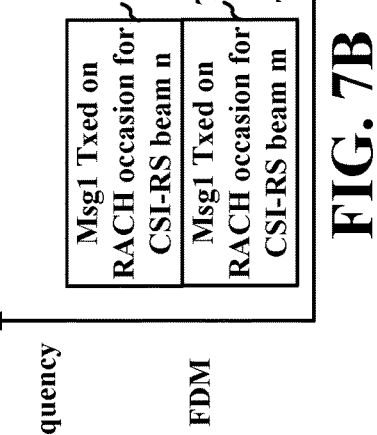

FIG. 7A illustrates an example of random access 700 for a PSCell 706 using a single TRP. The random access procedure may correspond to the random access procedure 519 in FIG. 5 and may include an exchange of messages as described in connection with FIG. 4. FIG. 7A illustrates that the base station transmits a reference signal, such as CSI-RS using beam sweeping by transmitting the CSI-RS using a different transmitting beam in each of a set of CSI-RS resources. FIG. 7A illustrates the PSCell 706 transmitting a CSI-RS using CSI-RS resources 1-4 on each of four different beams. The PSCell 706 may continue to transmit CSI-RS in using different beams in different CSI-RS resources, e.g., until the PSCell 706 transmits CSI-RS using CSI-RS resources 63-66. The UE 702 may transmit multiple preambles in Msg 1 (e.g., a first random access message corresponding to 403) using a number n of selected reference signals from the PSCell 706 on n allocated random access occasions. The allocated random access occasions may correspond to n reference signals of the cell, which may be TDM or FDM. FIG. 7A illustrates an example of TDM random access resources in which the Msg 1 transmissions 711 and 713 are transmitted by the UE 702 at different times. FIG. 7B illustrates an FDM example 750 in which the Msg 1 transmissions 711 and 713 overlap in time and are transmitted using different frequencies. Although the example in FIG. 7A illustrates the reference signal as a CSI-RS, the aspects may be similarly applied using SSBs transmitted by the base station using different beams. Although FIG. 7A illustrates the reference signals being transmitted from a single TRP and the Msg 1 transmissions being transmitted to the single TRP, aspects may also be applied to multiple TRPs. Although aspects are described in connection with a PSCell 706, the UE may similarly perform random access using beam sweeping with the PCell 704 or an SCell. The PCell 704 may provide a random access configuration to the UE 702, such as described in connection with FIG. 5. As illustrated in FIG. 7A, the UE 702 may transmit Msg 1 711 using a selected beam pair (e.g., a pair including a transmitting beam from the UE and a reception beam at the base station) and may transmit an additional Msg 1 713 using a different beam pair. For example, the UE may transmit Msg 1 711 using a transmitting beam corresponding to a CSI-RS beam n and may transmit Msg 1 713 using a CSI-RS beam m.

Figure 8:
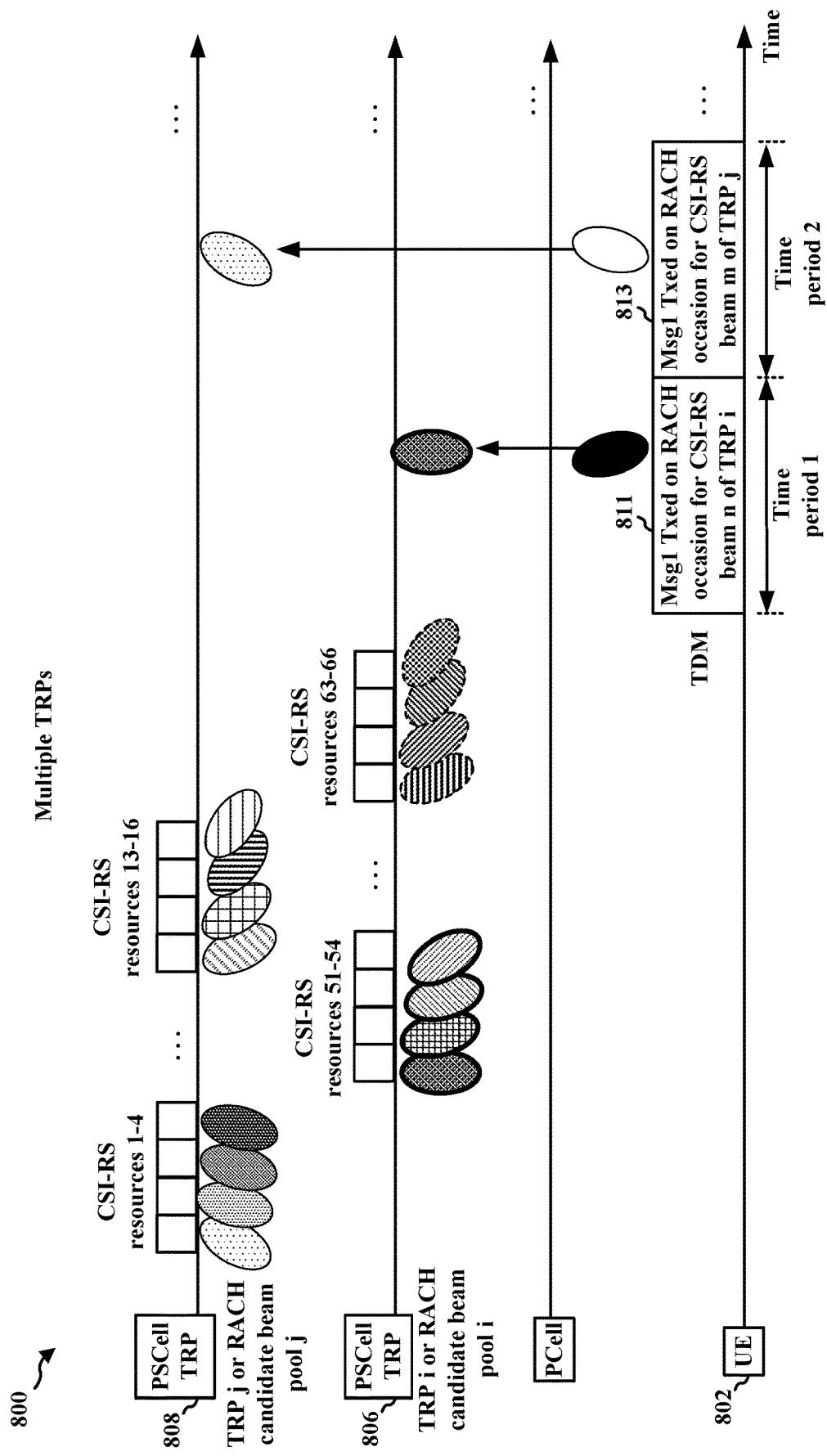
FIG. 8 illustrates example aspects of random access between a UE and a cell having multiple TRPs using multiple beams.

FIG. 8 illustrates an example of random access 800 for a PSCell using a multiple TRPs 806 and 808. The random access procedure 800 may correspond to the random access procedure 519 in FIG. 5 and may include an exchange of messages as described in connection with FIG. 4. The random access procedure 800 may include similar aspects to the random access procedure 700 in FIGS. 7A and 7B. However, in FIG. 8, the CSI-RS are transmitted from different TRPs. The UE 802 may transmit Msg 1 811 to the TRP 806 and may transmit the Msg 1 813 to TRP 808. The receiving beams of the PSCell may be from different random access resource candidate beam pools of a serving cell, which may correspond to FDM or TDM random access resources. FIG. 8 illustrates TRP 808 being associated with random access candidate beam pool j, and using reception beams for random access that are selected from the beam pool j. TRP 806 is associated with random access candidate beam pool i and uses reception beams for random access that are selected from the beam pool i. Although illustrated for two TRPs, different beam pools may be associated with a single TRP, e.g., for different random access resources. An index may be provided to the UE for each reference signal. Therefore, at a random access resource corresponding to a particular reference signal, the UE may be aware of the corresponding random access candidate beam pool. A single TRP may have 64 beams, which may be separated into different beam pools for random access. For example, a first 8 beams may be associated with beam pool index 1, the next 8 beams may be associated with beam pool index 2, and so forth with the final 8 beams being associated with beam pool index 8. The UE may select a beam from within the beam pool index for a particular transmission of a Msg 1.

Figure 9:
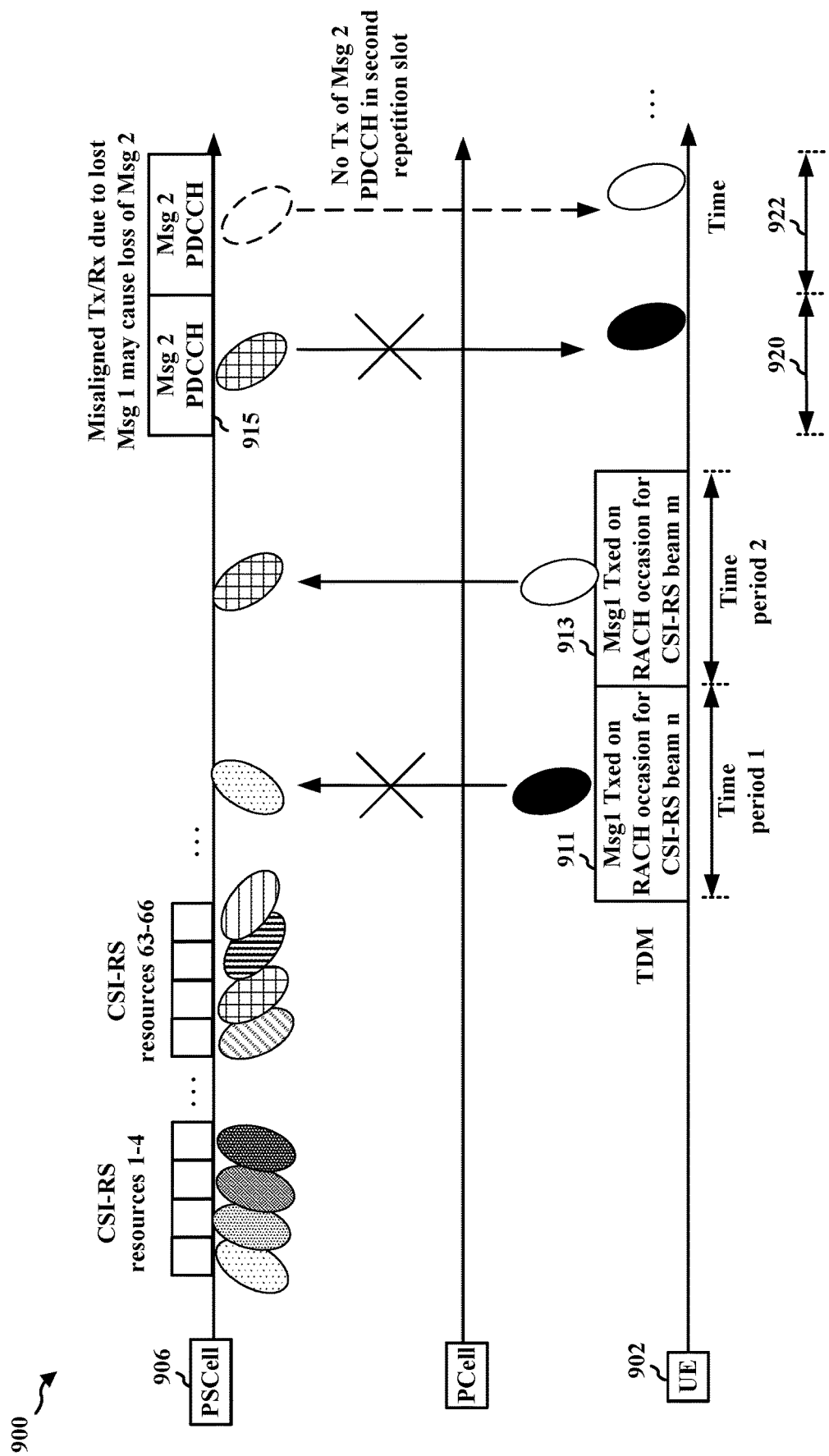
FIG. 9 illustrates example aspects of random access between a UE and a cell having a single TRP using multiple beams.

The use of a beam pool index may help to avoid beam pairing misalignment for both single TRPs and multiple TRPs. FIG. 9 illustrates an example random access procedure 900 using beam sweeping, which may include aspects described in connection with any of the examples in FIGS. 7A, 7B, and 8, and in which a beam pairing misalignment occurs. In FIG. 9, the Msg 1 transmission 911 from the UE 902 is not received by the PSCell 906, and the Msg 1 transmission 913 is received by the PSCell. As the Msg 1 transmission 911 is not received, the PSCell 906 may transmit a Msg 2 PDCCH 915 for the beam pair corresponding to Msg 1 913 during random access resources 920 when the UE 902 is using a reception beam corresponding to Msg 1 911. The UE 902 may monitor for a Msg 2 using a reception beam based on Msg 1 913 during random access resources 922, when no Msg 2 is transmitted by the PSCell 906, as illustrated by the dashed line. Thus, the failure of Msg 1 911 may lead to a misalignment of beams used by the PSCell 906 to transmit and the UE 902 to receive the Msg 2 PDCCH 915.

Figure 10:
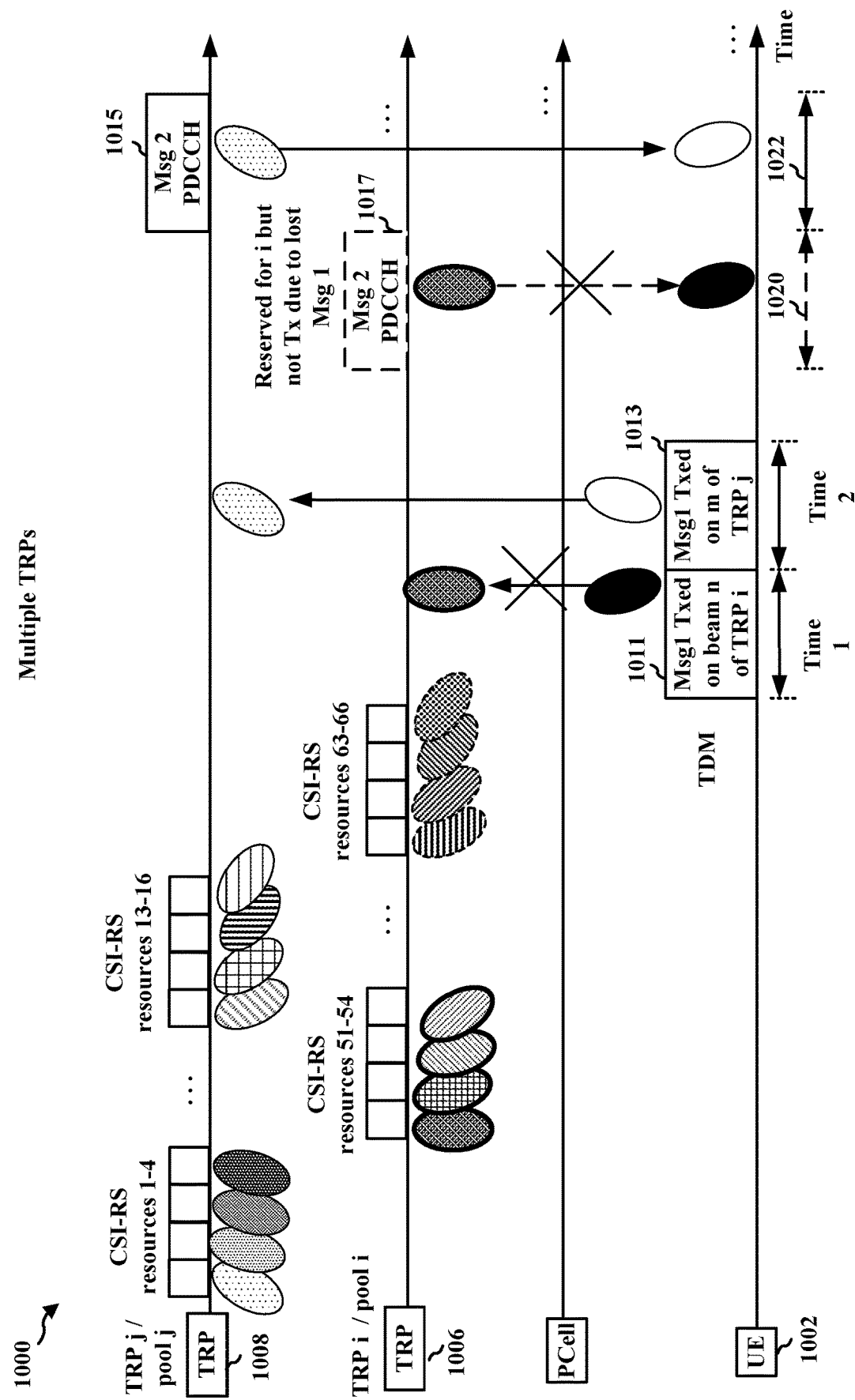
FIG. 10 illustrates example aspects of random access between a UE and a cell having multiple TRPs using multiple beams.

FIG. 10 illustrates an example random access procedure 1000 between a UE 1002 and a cell having multiple TRPs (e.g., TRP 906 and TRP 910), which may include aspects described in connection with any of the example in FIGS. 7A-9, and includes the use of random access resource candidate beam pools to avoid the beam misalignment described in connection with FIG. 9. In FIG. 10, the Msg 1 transmission 1011 from the UE 1002 is not received by the TRP 1006, and the Msg 1 transmission 1013 is received by the TRP 1008. As the Msg 1 transmission 1011 is not received, the cell may not send a Msg 2 PDCCH in response to the Msg 1 1011. However, the random access resource 1020 may be reserved for the pool i that for the Msg 1 1011. Thus, the cell may skip sending Msg 2 PDCCH 1017. As the random access resource 1020 is reserved or associated with the beam pool i, the cell does not transmit a different Msg 2 using the random access resource 1020, as occurred in FIG. 9. Instead, the cell transmits Msg 2 915 during random access resource 1022, when the UE is monitoring for the Msg 2 using a beam selected based on the corresponding beam pool j. Therefore, the beam pair used by the UE 1002 to receive the Msg 2 PDCCH 1015 and the cell to transmit the Msg 2 PDCCH 1015 are aligned, so that the UE 1002 may receive the Msg 2 PDCCH.

Figure 11:
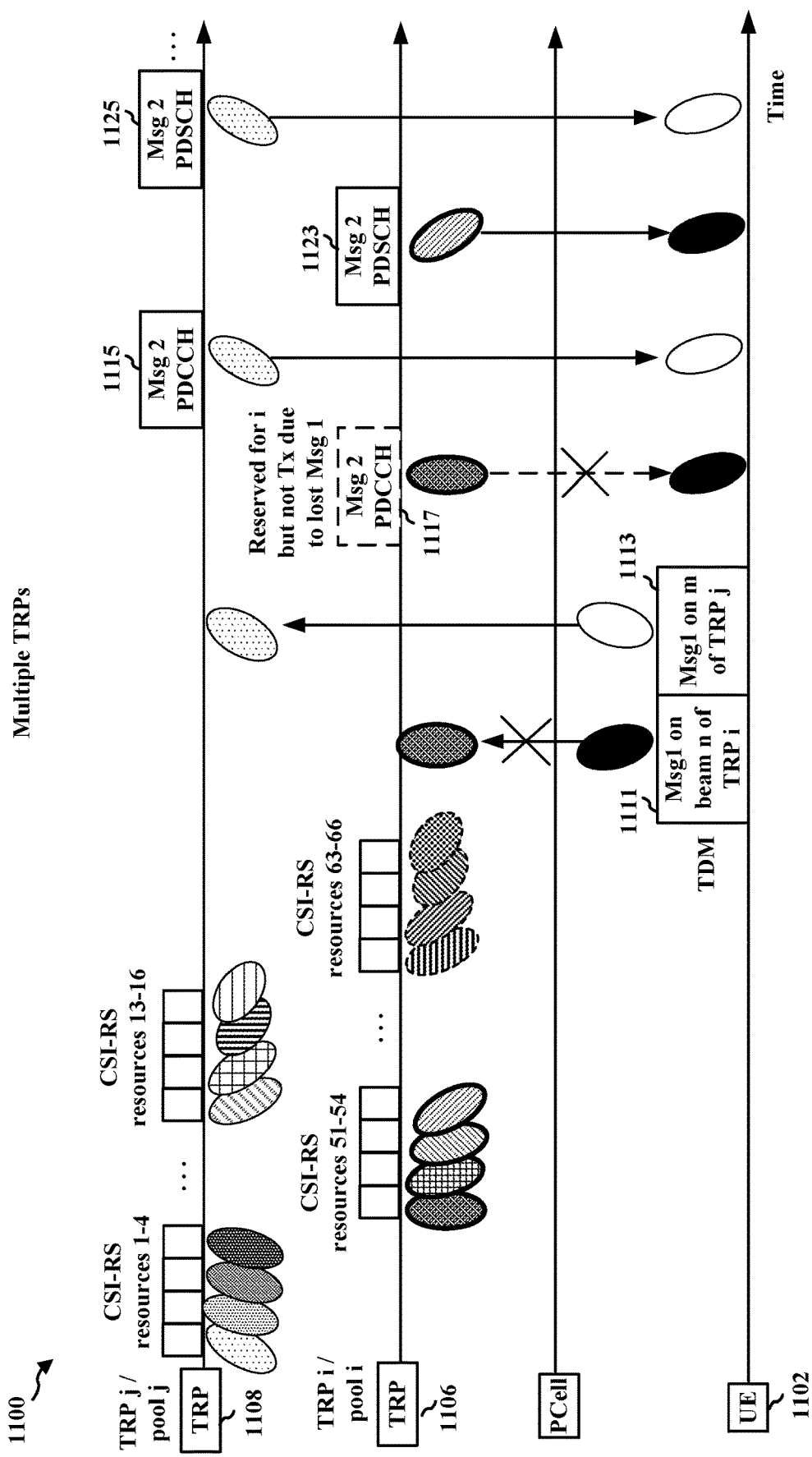
FIG. 11 illustrates example aspects of random access between a UE and a cell having multiple TRPs using multiple beams.

A cell may transmit multiple Msg 2 PDCCHs (e.g., 915, 1015, 1017, 1115, 1117) in a TDM mode, an FDM mode, or an SDM mode using beam sweeping from one or more TRPs, such as illustrated in FIGS. 9-11. As an example, in an SDM mode, the UE may transmit two first random access messages (Msg 1) using two beams from two different antenna panels to two TRPs of at least one cell using different spatial resources at the same frequency and time resources. A network may inform the UE that the cell will employ a Msg 2 PDCCH beam sweep so that the UE may be aware of potential PDCCH combining when receiving the Msg 2 transmissions from the cell. In a first option, the base station may transmit a Msg 2 PDCCH using beams based on the n best reference signals selected during RACH measurements, e.g., the n best beams that are used for receiving Msg 1 from the UE. At times, this option may involve beam misalignment, as described in connection with FIG. 9, if a Msg 1 transmission is lost and not received by the cell. Beam pair misalignment may be addressed through a pre-configuration of beams for random access resources. In a second option, the cell may transmit Msg 2 PDCCH using a single, best reference signal from each random access resource candidate beam pool. The random access resource candidate beam pools may be indicated by RRC signaling and may be configured with a reference signal index per beam pool index. As the best beam is used from a particular set of beams in the beam pool for a particular Msg 2 resource, the UE may select a reception beam based on the corresponding random access resource candidate beam pool and is more likely to experience beam pair alignment with the base station.

FIG. 11 illustrates an example random access procedure 1100, which may include aspects described in connection with any of the examples in FIGS. 7A-10, and includes joint random access message transmissions that may improve reliability and robustness of random access communication. In FIG. 11, the cell may transmit multiple transmissions of Msg 2 PDSCH using beam sweeping. The cell may use a single TRP, e.g., as in FIGS. 7A and 9, or may use multiple TRPs, as illustrated in FIG. 11. Although FIG. 9 illustrates a TDM example, the Msg 2 PDSCHs may be beam swept using TDM or FDM. The Msg 2 PDSCHs may be transmitted using beams corresponding to the Msg 2 PDCCH scheduling the PDSCH, e.g., using a same beam as the corresponding Msg 2 PDCCH. In another example, a Msg 2 PDSCH may be transmitted using a different beam than the Msg 2 PDSCH that schedules the Msg 2 PDSCH. In some examples, a Msg 2 PDCCH may carry resource allocation information for multiple Msg 2 PDSCHs. Then, if one of the Msg 2 PDCCHs is not received, the UE may still be able to receive the Msg 2 PDSCH, because the UE 1102 may be able to determine the corresponding resources from a different Msg 2 PDCCH.

In FIG. 11, the Msg 1 transmission 1111 is not received by the cell, e.g., by TRP 1106. The Msg 1 transmission 1113 is received by the TRP 1108. The TRP 1106 does not transmit a Msg 2 PDCCH 1117 corresponding to the Msg 1 1111, such as described in connection with FIGS. 9 and 10. The TRP 1108 that did receive Msg 1 1113 does transmit Msg 2 PDCCH 1115 scheduling the Msg 2 PDSCH 1125. However, the Msg 2 PDCCH 1115 may include resource allocation information about Msg 2 PDSCH 1123. Therefore, the UE 1102 may receive the Msg 2 PDSCH 1123, even though the corresponding Msg 2 PDCCH 1117 was not transmitted (or was transmitted by the cell but not received by the UE 1102). In some aspects, each Msg 2 PDCCH (e.g., 1115 and 1117, if transmitted) may carry the resource allocation information for multiple Msg 2 PDSCHs (e.g., 1123 and 1125). Therefore, communication may continue on multiple beam pairs even if one beam pair transmission of Msg 2 PDCCH is successful.

Similarly, each Msg 2 PDSCH (e.g., 1123 and 1125) can carry uplink grant information for multiple Msg 3 transmissions from the UE 1102. Then, the UE may transmit multiple Msg 2 transmissions using different beams even if one or more Msg 2 transmissions are lost and not received by the UE.

Figure 12:
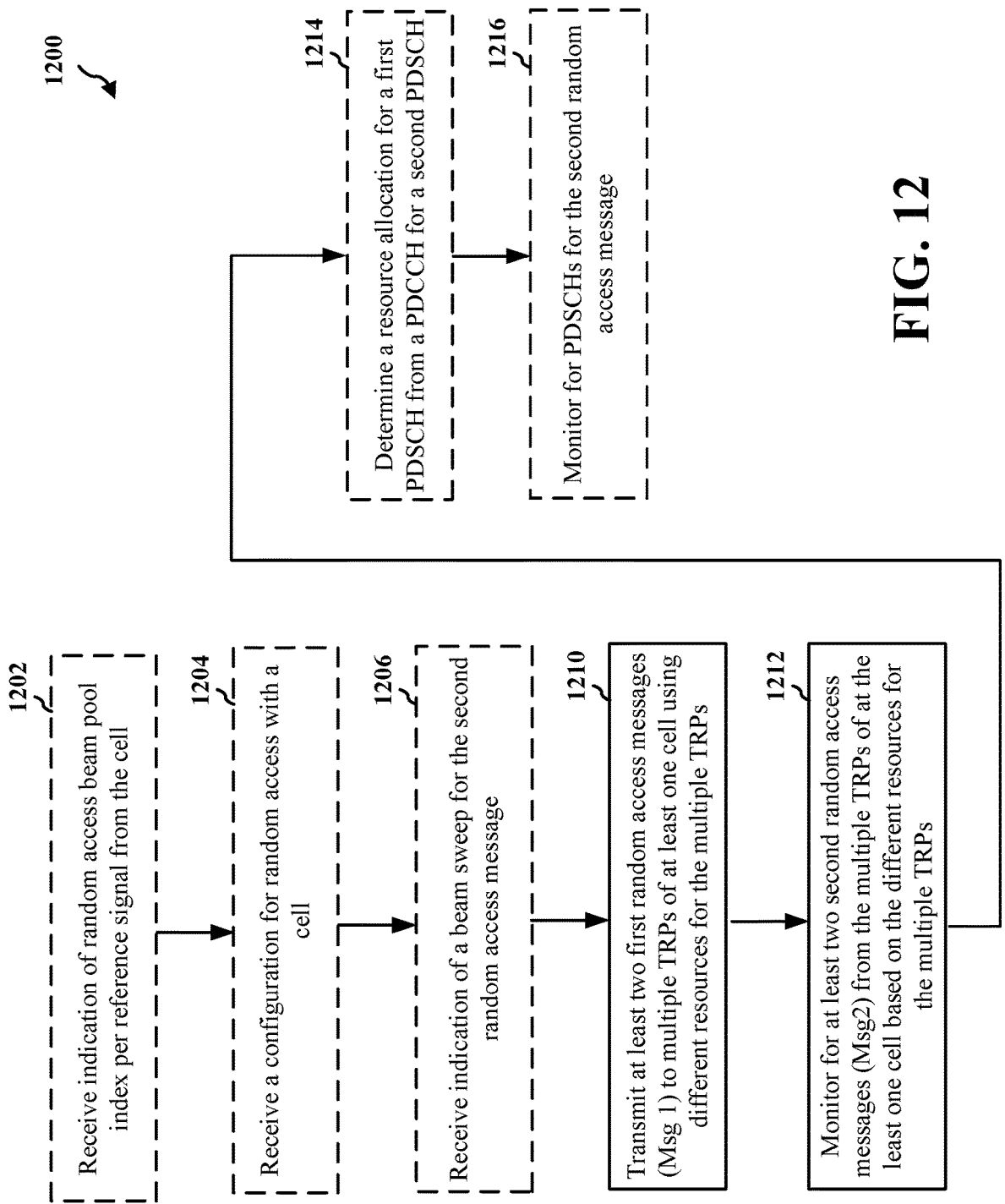
FIG. 12 is a flowchart of a method of wireless communication.

FIG. 12 is a flowchart 1200 of a method of wireless communication. The method may be performed by a UE or a component of a UE (e.g., the UE 104, 350, 402, 502, 702, 802, 902, 1002, 1102; the apparatus 1402; a processing system, which may include the memory 360 and which may be the entire UE 350 or a component of the UE 350, such as the TX processor 368, the RX processor 356, and/or the controller/processor 359). Optional aspects are illustrated with a dashed line. The method may improve random access between a UE and a base station by providing multiple transmission opportunities and applying beam sweeping for random access transmissions. Aspects may help to avoid failure due to interference, blockages, etc. Aspects of the method may help to improve reliability of the random access and reduce latency for the random access.

At 1204, the UE may receive a configuration for random access with at least one cell. The configuration may be received, e.g., in RRC signaling from a base station. The configuration may be for random access with a cell having multiple TRPs, for example. The reception of the configuration may be performed, e.g., by the configuration component 1446 and/or the cellular RF transceiver 1422 of the apparatus 1402 in FIG. 14. The UE may receive the configuration for random access from the PCell. The cell may be a PCell for the UE. In another example, the cell may be an SCell or a PSCell for the UE, e.g., as described in connection with FIG. 5.

At 1210, the UE transmits at least two first random access messages (Msg 1) to multiple TRPs of at least one cell using different resources for the multiple TRPs. For example, FIGS. 8, 9, 10, and 11 illustrate aspects of a UE transmitting a Msg 1 to multiple TRPs using different resources. The different resources may comprise different spatial resources, e.g., as described in connection with any of FIGS. 6-11. As an example, the UE may use two beams (e.g., from two different UE antenna panels) to transmit two first random access messages (Msg 1) to two TRPs of at least one cell using different spatial resources at the same frequency and time resource. The different resources may comprise different frequency resources, e.g., as illustrated in FIG. 7B. As an example, the UE may use two beams (e.g., from two different UE antenna panels) to transmit two first random access messages (Msg 1) to two TRPs of at least one cell using different spatial resources using different frequency resources and the same time resource. The different resources may comprise different time resources, e.g., as described in connection with any of FIGS. 6-11. As an example, the UE may use two beams (e.g., from two different UE antenna panels) to transmit two first random access messages (Msg 1) to two TRPs of at least one cell using different spatial resources at the same frequency resource and different time resources. As another example, the UE may use two beams (e.g., from two different UE antenna panels) to transmit two first random access messages (Msg 1) to two TRPs of at least one cell using different spatial resources at different frequency and time resource. The transmission may be performed, e.g., by the Msg 1 component 1440 and/or the cellular RF transceiver 1422 of the apparatus 1402 in FIG. 14.

The first random access message may include a preamble (e.g., such as first random access message 403 described in connection with FIG. 4). The UE may transmit the first random access message using a number of transmitting beams for reference signals corresponding to a number of receiving beams from the cell during a corresponding number of allocated random access occasions, with each random access occasion being associated with a reference signal for receiving the preamble. The reference signals may include an SSB and/or a CSI-RS from the cell. The reference signals may be received from multiple TRPs for the cell, such as described in connection with FIGS. 8, 10, and 11. The first random access message may be time division multiplexed on the number of transmitting beams, such as illustrated in the example in FIG. 7A. The first random access message may be frequency division multiplexed on the number of transmitting beams, such as illustrated in the example in FIG. 7B.

The UE may transmit a first preamble for reception by a first receive beam selected from a first random access resource candidate beam pool at the cell and may transmits a second preamble for reception by a second receive beam selected from a second random access resource candidate beam pool at the cell, such as described in connection with FIGS. 8, 10, and 11. The first receive beam may be for a first TRP of the cell, and the second receive beam may be for a second TRP of the cell, e.g., as described in connection with FIGS. 8, 10, and 11.

At 1212, the UE monitors for at least two second random access messages (Msg 2) from the multiple TRPs of the at least one cell based on the different resources for the multiple TRPs. The monitoring may be performed, e.g., by the Msg 2 component 1442 and/or the cellular RF transceiver 1422 of the apparatus 1402 in FIG. 14.

As illustrated at 1206, the UE may receive, from the base station, an indication of a beam sweep for the second random access message to the UE. The reception of the indication may be performed, e.g., by the beam sweep component 1448 and/or the cellular RF transceiver 1422 of the apparatus 1402 in FIG. 14. As part of receiving the second random access message from the cell, the UE may receive a control channel of the second random access message (e.g., a Msg 2 PDCCH) that is transmitted with a number of beams based on multiple reference signals. For example, FIGS. 9, 10, and 11 illustrates examples of Msg 2 PDCCH transmitted using different beams and received using different beams. The different beams (e.g., the number of beams) may be transmitted from a single TRP, such as illustrated in FIG. 9. The different beams (e.g., the number of beams) may be transmitted from multiple TRPs, such as illustrated in FIGS. 10 and 11.

The UE may receive a control channel of the second random access message (e.g., Msg 2 PDCCH) that is transmitted with a single beam per random access beam pool. The UE may receive an indication of each random access beam pool in RRC signaling, and the UE may receive a configuration of a reference signal index per random access beam pool. The multiple random access beam pools may be for a single TRP. The multiple random access beam pools may be for multiple TRPs.

As illustrated at 1202, the UE may receive, from a base station, an indication of a random access beam pool index per reference signal from the cell. The UE may use the indication to resolve potential pairing misalignment for reception if the second random access message when the first random access message is not correctly received by the base station. The reception may be performed, e.g., by the beam pool component 1444 and/or the cellular RF transceiver 1422 of the apparatus 1402 in FIG. 14.

As illustrated at 1216, the UE may monitor for multiple PDSCHs for the second random access message from the cell. The monitoring may be performed, e.g., by the Msg 2 component 1442 of the apparatus 1402 in FIG. 14. FIG. 11 illustrates an example of two Msg 2 PDSCH being transmitted using different beams at the PSCell and being received using different beams at the UE 1102. In some examples, each PDSCH may use a same beam as a control channel (e.g., PDCCH) scheduling the respective PDSCH. Alternately, a PDSCH may use a different beam than a corresponding control channel (e.g., PDCCH) scheduling the PDSCH. The different beam for the Msg 2 PDSCH may be configured by DCI in the corresponding control channel (e.g., Msg 2 PDCCH).

As illustrated at 1214, the UE may determine a resource allocation for a first PDSCH of the multiple PDSCHs from a control channel for a second PDSCH. The determination of the resource allocation may be performed, e.g., by the resource allocation component 1450 of the apparatus 1402 in FIG. 14. Thus, a Msg 2 PDCCH may carry information for more than one Msg 2 PDSCH, such as described in connection with FIG. 11. For example, each random access Msg 2 PDCCH may carry resource allocation information for the multiple PDSCHs for the random access Msg 2. Thus, even if a Msg 2 PDCCH is missed on a particular beam, the UE may still obtain the resource allocation for the Msg 2 PDSCH from another PDCCH on a different beam. Similarly, each of the Msg 2 PDSCHs may carry uplink grant information for multiple random access Msg 3 transmissions. Thus, even if a PDSCH is missed on a particular beam, the UE may still obtain the uplink grant information for the Msg 3.

Figure 13:
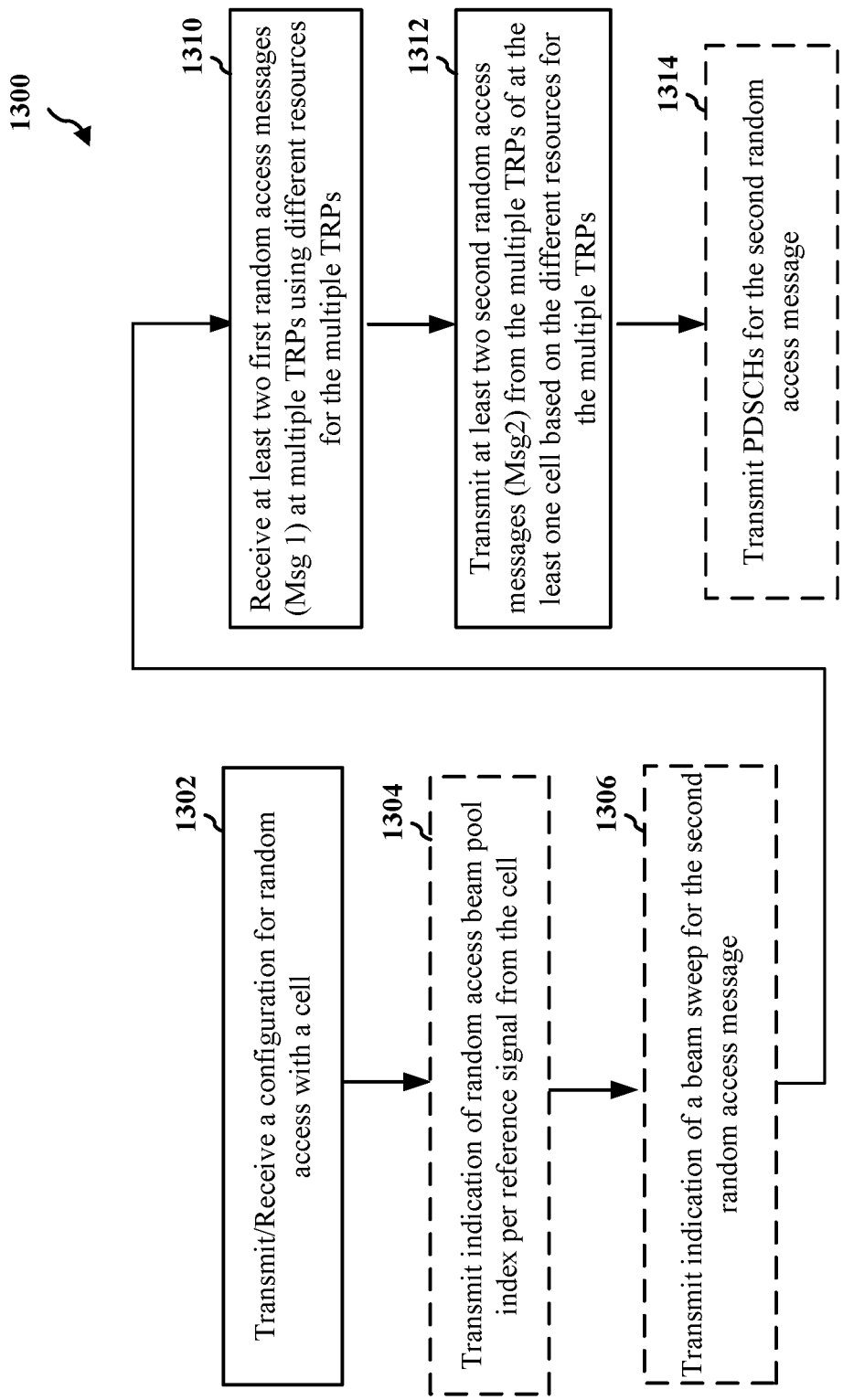
FIG. 13 is a flowchart of a method of wireless communication.

FIG. 13 is a flowchart 1300 of a method of wireless communication. The method may be performed by a base station or a component of a base station (e.g., the base station 102, 180, 310, 404; cell 504, 506, 704, 706, 906; TRPs 806, 808, 1006, 1008, 1106, 1108; the apparatus 1502; a processing system, which may include the memory 376 and which may be the entire base station 310 or a component of the base station 310, such as the TX processor 316, the RX processor 370, and/or the controller/processor 375). In some examples, the method may be performed by a PCell, an SCell, or a PSCell for the UE. Optional aspects are illustrated with a dashed line. The method may improve random access between the base station and a UE by providing multiple transmission opportunities and applying beam sweeping for random access transmissions. Aspects may help to avoid failure due to interference, blockages, etc. Aspects of the method may help to improve reliability of the random access and reduce latency for the random access.

At 1302, the base station may transmit a configuration for random access with a UE. The transmission may be performed, e.g., by the configuration component 1546 and/or the cellular RF transceiver 1522 of the apparatus 1502 in FIG. 15. For example, if the base station is a PCell for the UE, the base station may transmit the configuration to the UE. If the base station is an SCell or a PSCell, the base station may be received, e.g., from a PCell for the UE, and determined based on the configuration received from the PCell.

At 1310, the base station receives at least two first random access messages (Msg 1) at multiple TRPs of at least one cell using different resources for the multiple TRPs. For example, FIGS. 8, 9, 10, and 11 illustrate aspects of a Msg 1 transmitted to multiple TRPs using different resources. The different resources may comprise different spatial resources, e.g., as described in connection with any of FIGS. 6-11. As an example, the base station may receive two beams (e.g., from two different UE antenna panels) that comprise two first random access messages (Msg 1) at two TRPs of at least one cell using different spatial resources at the same frequency and time resource. The different resources may comprise different frequency resources, e.g., as illustrated in FIG. 7B. As an example, the base station may receive two beams (e.g., from two different UE antenna panels) that comprise two first random access messages (Msg 1) at two TRPs of at least one cell using different spatial resources using different frequency resources and the same time resource. The different resources may comprise different time resources, e.g., as described in connection with any of FIGS. 6-11. As an example, the base station may receive use two beams (e.g., from two different UE antenna panels) at that comprise first random access messages (Msg 1) at two TRPs of at least one cell using different spatial resources at the same frequency resource and different time resources. As another example, the base station may receive two beams (e.g., from two different UE antenna panels) comprising two first random access messages (Msg 1) at two TRPs of at least one cell using different spatial resources at different frequency and time resources. The reception may be performed, e.g., by the Msg 1 component 1540 and/or the cellular RF transceiver 1522 of the apparatus 1502 in FIG. 15.

The first random access message may include a preamble. The base station may receive the first random access message from the UE using a number of reception beams for reference signals corresponding to a number of transmitting beams from the UE during a corresponding number of allocated random access occasions, where each random access occasion is associated to a reference signal.

The reference signals may include an SSB and/or a CSI-RS from the cell. The reference signals may be received from a single TRP for the cell, such as described in connection with FIGS. 7A and 9. The reference signals may be received from multiple TRPs for the cell, such as described in connection with FIGS. 8, 10, and 11. The first random access message may be time division multiplexed on the number of transmitting beams, such as illustrated in the example in FIG. 7A. The first random access message may be frequency division multiplexed on the number of transmitting beams, such as illustrated in the example in FIG. 7B.

The base station may receive a first preamble using a first beam from a first random access beam pool and receive a second preamble using a second beam from a second random access beam pool, such as described in connection with FIGS. 8, 10, and 11. The first preamble may be received using a first receive beam selected from a first random access resource candidate beam pool at a cell, and the second preamble may be received using a second receive beam selected from a second random access resource candidate beam pool at the cell. The first receive beam may be for a first TRP of the cell, and the second receive beam may be for a second TRP of the cell, e.g., as described in connection with FIGS. 8, 10, and 11. The first receive beam and the second receive beam may be for a single TRP of the cell, such as described in connection with FIGS. 7A and 9.

As illustrated at 1304, the base station may transmit, to the UE, an indication of a random access beam pool index per reference signal from a cell, e.g., for the UE to use to resolve potential pairing misalignment for reception if the second random access message when the first random access message is not correctly received by the base station.

At 1312, the base station transmits, to the UE, at least two second random access messages (Msg 2) from the multiple TRPs of the at least one cell based on the different resources for the multiple TRPs. The transmission may be performed, e.g., by the Msg 2 component 1542 and/or the cellular RF transceiver 1522 of the apparatus 1502 in FIG. 15.

The random access messages may include a second random access message transmitted by a cell using the multiple beams. Thus, as illustrated at 1312, the base station may transmit the second random access message to the UE using multiple beams, e.g., based on beam sweeping. As illustrated at 1306, the base station may transmit, to the UE, an indication of a beam sweep for the second random access message to the UE. The transmission may be performed, e.g., by the beam sweep component 1548 and/or the cellular RF transceiver 1522 of the apparatus 1502 in FIG. 15.

As part of transmitting the second random access message, at 1312, the base station may transmit a control channel of the second random access message (e.g., a Msg 2 PDCCH) using a number of beams based on multiple reference signals. For example, FIGS. 9, 10, and 11 illustrates examples of Msg 2 PDCCH transmitted using different beams and received using different beams. The different beams (e.g., the number of beams) may be transmitted from multiple TRPs, such as illustrated in FIGS. 10 and 11. The base station may transmit a control channel of the second random access message (e.g., a Msg 2 PDCCH) using a single beam per random access beam pool. The base station may transmit an indication of each random access beam pool in RRC signaling and may configure the UE with a reference signal index per random access beam pool. The multiple random access beam pools may be for a single TRP. The multiple random access beam pools may be for multiple TRPs. The transmission may be performed, e.g., by the beam pool component 1544 and/or the cellular RF transceiver 1522 of the apparatus 1502 in FIG. 15.

As illustrated at 1314, the base station may transmit multiple PDSCHs for the second random access message, each of the multiple PDSCHs using a different beam. The transmission may be performed, e.g., by the Msg 2 component 1542 and/or the cellular RF transceiver 1522 of the apparatus 1502 in FIG. 15. FIG. 11 illustrates an example of two Msg 2 PDSCH being transmitted using different beams at the PSCell and being received using different beams at the UE 1102. In some examples, each PDSCH may use a same beam as a control channel (e.g., PDCCH) scheduling the respective PDSCH. Alternately, a PDSCH may use a different beam than a corresponding control channel (e.g., PDCCH) scheduling the PDSCH. The different beam for the Msg 2 PDSCH may be configured by DCI in the corresponding control channel (e.g., Msg 2 PDCCH).

Each control channel for the second random access message may carry resource allocation information for the multiple PDSCHs. For example, a Msg 2 PDCCH may carry information for more than one Msg 2 PDSCH, such as described in connection with FIG. 11. For example, each random access Msg 2 PDCCH may carry resource allocation information for the multiple PDSCHs for the random access Msg 2. Thus, even if a Msg 2 PDCCH is missed on a particular beam, the base station may still enable the UE to obtain the resource allocation for the Msg 2 PDSCH from another PDCCH on a different beam. Similarly, each of the Msg 2 PDSCHs may carry uplink grant information for multiple random access Msg 3 transmissions. Thus, even if a PDSCH is missed on a particular beam, the base station may still enable the UE to obtain the uplink grant information for the Msg 3.

The method in FIG. 13 may be performed by an apparatus that includes components configured to perform each of the blocks of the algorithm in the aforementioned flowchart of FIG. 13 and/or the aspects described in connection with a base station or a cell in FIGS. 4-11. As such, each block in the aforementioned flowchart of FIG. 13 and/or the aspects described in connection with FIGS. 4-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
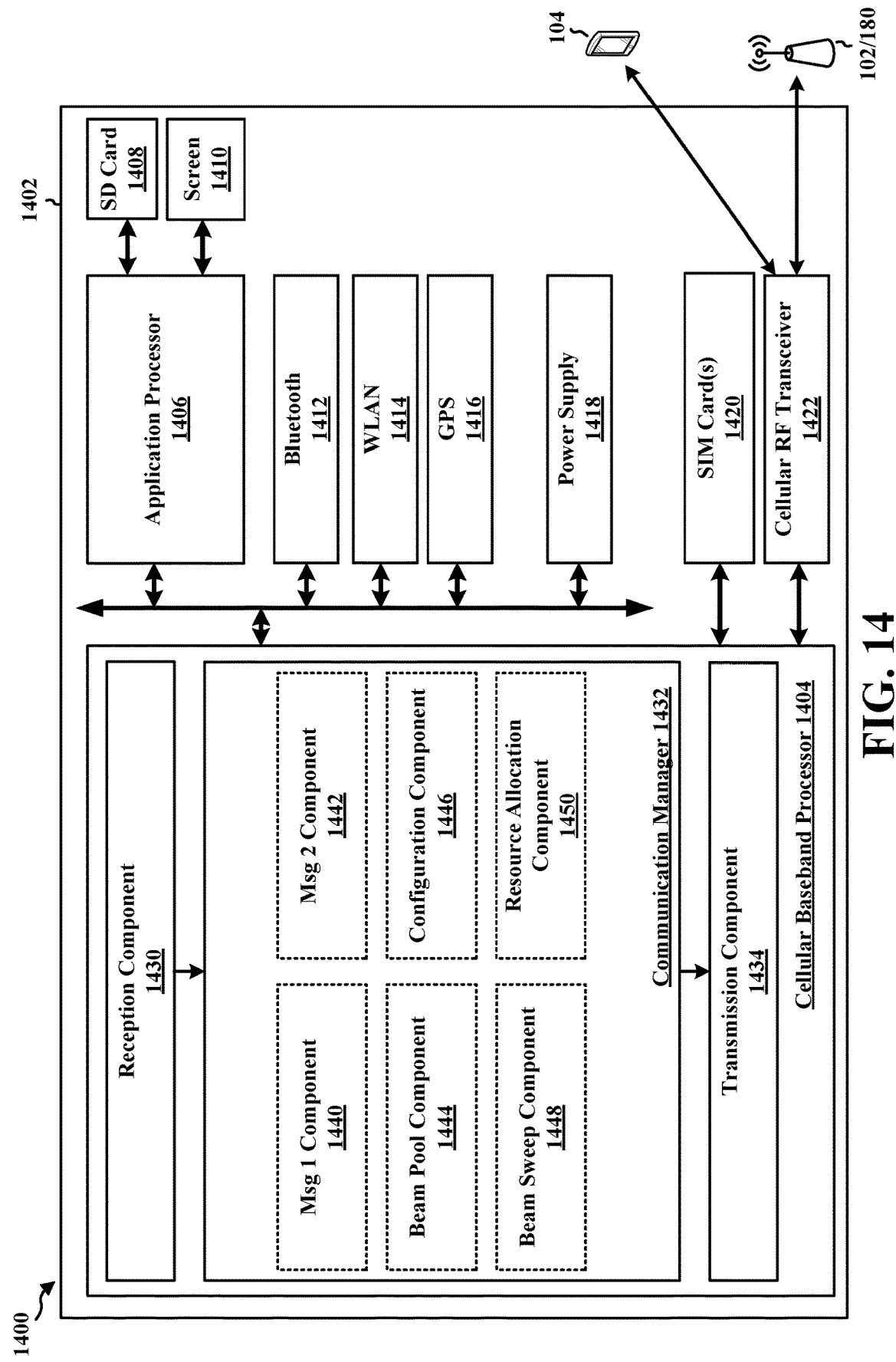
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a Msg 1 component 1440 that is configured to transmit at least two first random access messages (Msg 1) to multiple TRPs of at least one cell using different resources for the multiple TRPs, e.g., as described in connection with 1210 in FIG. 12. The communication manager 1432 further includes a Msg 2 component 1442 that is configured to monitor for at least two second random access messages (Msg 2) from the multiple TRPs of the at least one cell based on the different resources for the multiple TRPs, e.g., as described in connection with 1212 and/or 1216. The communication manager 1432 further includes a beam pool component 1444 that is configured to receive, from a base station, an indication of a random access beam pool index per reference signal from the cell, e.g., as described in connection with 1202 in FIG. 12. The communication manager 1432 further includes a configuration component 1446 that is configured to receive a configuration for random access with at least one cell, e.g., as described in connection with 1204. The communication manager 1432 further includes a beam sweep component 1448 that is configured to receive, from the base station, an indication of a beam sweep for the second random access message to the UE, e.g., as described in connection with 1206 in FIG. 12. The communication manager 1432 further includes a resource allocation component 1450 that is configured to determine a resource allocation for a first PDSCH of the multiple PDSCHs from a control channel for a second PDSCH, e.g., as described in connection with 1214 in FIG. 12.

The apparatus may include additional components that perform each of the blocks of the algorithm in the flowchart of FIG. 12 and/or the aspects described in connection with UE in FIGS. 4-11. As such, each block in the aforementioned flowchart of FIG. 12 and/or the aspects described in connection with UE in FIGS. 4-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for transmitting at least two first random access messages (Msg 1) to multiple TRPs of at least one cell using different resources for the multiple TRPs; and means for monitoring for at least two second random access messages (Msg 2) from the multiple TRPs of the at least one cell based on the different resources for the multiple TRPs. The apparatus 1402 may further include means for receiving a configuration for random access with the at least one cell having the multiple TRPs. The apparatus 1402 may further include means for receiving, from a base station, an indication of a random access beam pool index per reference signal from the cell. The apparatus 1402 may further include means for receiving, from a base station, an indication of a beam sweep for the second random access message to the UE. The apparatus 1402 may further include means for determining a resource allocation for a first PDSCH of the multiple PDSCHs from a control channel for a second PDSCH. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
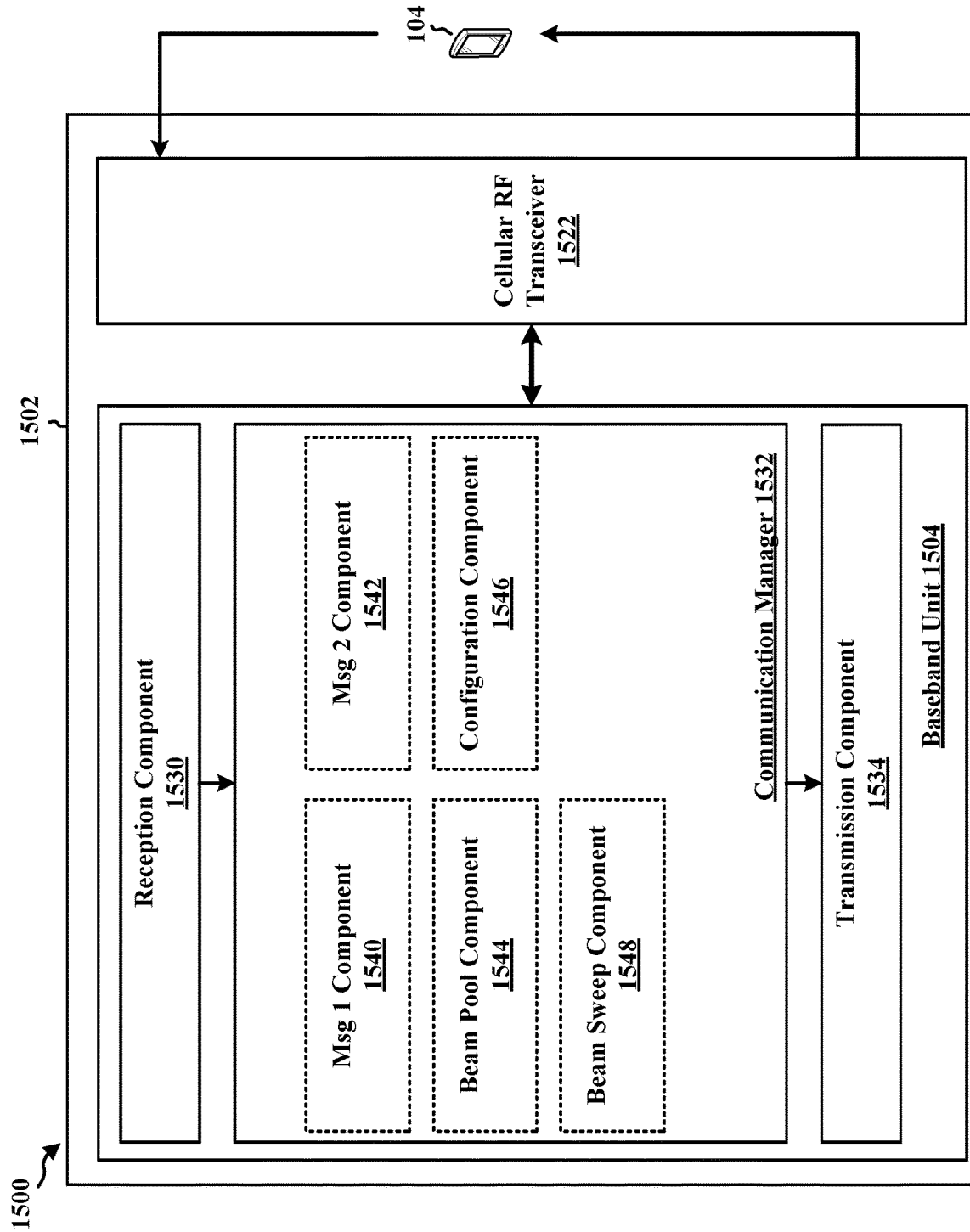
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a Msg 1 component 1540 that is configured to receive at least two first random access messages (Msg 1) at multiple TRPs of at least one cell using different resources for the multiple TRPs, e.g., as described in connection with 1310 in FIG. 13. The communication manager 1532 further includes a Msg 2 component 1542 that is configured to transmit at least two second random access messages (Msg 2) from the multiple TRPs of the at least one cell based on the different resources for the multiple TRPs, e.g., as described in connection with 1312 and/or 1314. The communication manager 1532 further includes a beam pool component 1544 that is configured to transmit an indication of a random access beam pool index per reference signal from the cell, e.g., as described in connection with 1304 in FIG. 13. The communication manager 1532 further includes a configuration component 1546 that is configured to receive a configuration for random access with at least one cell, e.g., as described in connection with 1302. The communication manager 1532 further includes a beam sweep component 1548 that is configured to transmit an indication of a beam sweep for the second random access message to the UE, e.g., as described in connection with 1306 in FIG. 13.

The apparatus 1402 may include additional components that perform each of the blocks of the algorithm in the aforementioned flowchart of FIG. 13 and/or the aspects described in connection with a base station or a cell in FIGS. 4-11. As such, each block in the aforementioned flowchart of FIG. 13 and/or the aspects described in connection with a base station or a cell in FIGS. 4-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving, from a UE, at least two first random access messages (Msg 1) at multiple TRPs of at least one cell based on different resources for the multiple TRPs. The apparatus 1502 may further include means for transmitting, to the UE, at least two second random access messages (Msg 2) from the multiple TRPs of the at least one cell based on the different resources for the multiple TRPs. The apparatus 1502 may further include means for transmitting, to the UE, an indication of a random access beam pool index per reference signal from a cell. The apparatus 1502 may further include means for transmitting an indication of a beam sweep for the second random access message to the UE. The apparatus 1502 may further include means for transmitting multiple PDSCHs for the second random access message, each of the multiple PDSCHs using a different beam. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following aspects are illustrative only and may be combined with other aspects or teaching described herein, without limitation.

Aspect 1 is a method of wireless communication at a UE, comprising: transmitting at least two first random access messages (Msg 1) to multiple TRPs of at least one cell using different resources for the multiple TRPs; and monitoring for at least two second random access messages (Msg 2) from the multiple TRPs of the at least one cell based on the different resources for the multiple TRPs.

In aspect 2, the method of aspect 1 further includes the different resources comprise different spatial resources.

In aspect 3, the method of aspect 1 or aspect 2 further includes that the different resources comprise different frequency resources.

In aspect 4, the method of any of aspects 1-3 further includes that the different resources comprise different time resources.

In aspect 5, the method of any of aspects 1-4 further includes receiving a configuration for random access with the at least one cell having the multiple TRPs.

In aspect 6, the method of any of aspects 1-5 further includes that the at least one cell comprises a PCell for the UE, an SCell for the UE, or a PSCell for the UE.

In aspect 7, the method of any of aspects 1-6 further includes that each of the at least two first random access messages includes a preamble, and wherein the UE transmits the at least two first random access message using a number of transmitting beams associated with reference signals corresponding to a number of receiving beams from the at least one cell during a corresponding number of allocated random access occasions, with each random access occasion being associated with a reference signal for receiving the preamble.

In aspect 8, the method of aspect 7 further includes that the reference signals include at least one of an SSB or a CSI-RS from the at least one cell.

In aspect 9, the method of aspect 7 or 8 further includes that the reference signals are received from the multiple TRPs for a single cell.

In aspect 10, the method of any of aspects 7-9 further includes that the at least two first random access messages are time division multiplexed on the number of transmitting beams.

In aspect 11, the method of any of aspects 7-10 further includes that the at least two first random access messages are frequency division multiplexed on the number of transmitting beams.

In aspect 12, the method of any of aspects 7-11 further includes that the UE transmits a first preamble for reception by a first receive beam selected from a first random access resource candidate beam pool for a cell and transmits a second preamble for reception by a second receive beam selected from a second random access resource candidate beam pool for the cell, the first receive beam being for a first TRP of the cell, and the second receive beam being for a second TRP of the cell.

In aspect 13, the method of any of aspect 12 further includes that receiving, from a base station, an indication of a random access beam pool index per reference signal from the cell.

In aspect 14, the method of any of aspects 1-13 further includes receiving, from a base station, an indication of a beam sweep for the at least two second random access messages to the UE.

In aspect 15, the method of any of aspects 1-14 further includes that the UE receives a control channel of the at least two second random access messages that is transmitted with a number of beams based on multiple reference signals, wherein the number of beams are transmitted from the multiple TRPs.

In aspect 16, the method of any of aspects 1-15 further includes that the UE receives a control channel of the at least two second random access messages that is transmitted with a single beam per random access beam pool, wherein the UE receives an indication of each random access beam pool in RRC signaling, wherein the UE receives a configuration of a reference signal index per random access beam pool, and wherein multiple random access beam pools are for the multiple TRPs.

In aspect 17, the method of any of aspects 1-16 further includes that the UE monitors for multiple PDSCHs for the at least two second random access messages from the at least one cell.

In aspect 18, the method of aspect 17 further includes that the UE monitors for each PDSCH based on a same beam as a control channel scheduling the respective PDSCH.

In aspect 19, the method of aspect 17 further includes that the UE monitors for a PDSCH from the multiple PDSCHs based on a different beam than a corresponding control channel scheduling the PDSCH, wherein the different beam is configured by DCI in the corresponding control channel.

In aspect 20, the method of aspect 17 further includes determining a resource allocation for a first PDSCH of the multiple PDSCHs from a control channel for a second PDSCH, wherein each control channel for the at least two second random access messages carries resource allocation information for the multiple PDSCHs for the at least two second random access messages.

In aspect 21, the method of aspect 17 further includes that each of the multiple PDSCHs carry uplink grant information for a plurality of third random access messages.

Aspect 22 is a device including one or more processors and one or more memories in electronic communication with the one or more processors storing instructions executable by the one or more processors to cause the device to implement a method as in any of aspects 1-21.

Aspect 23 is a system or apparatus including means for implementing a method or realizing an apparatus as in any of aspects 1-21.

Aspect 24 is a non-transitory computer readable medium storing instructions executable by one or more processors to cause the one or more processors to implement a method as in any of aspects 1-21.

Aspect 25 is a method of wireless communication at a base station, comprising: receiving, from a UE, at least two first random access messages (Msg 1) at multiple TRPs of at least one cell based on different resources for the multiple TRPs; and transmitting, to the UE, at least two second random access messages (Msg 2) from the multiple TRPs of the at least one cell based on the different resources for the multiple TRPs.

In aspect 26, the method of aspect 25 further includes that the different resources comprise at least one of different spatial resources, different frequency resources, or different time resources.

In aspect 27, the method of aspect 25 of aspect 26 further includes that each of the at least two first random access messages includes a preamble, and wherein the base station receives the at least two first random access messages from the UE using a number of reception beams for reference signals corresponding to a number of transmitting beams from the UE during a corresponding number of allocated random access occasions, each random access occasion being associated with a reference signal.

In aspect 28, the method of aspect 27 further includes that the reference signals include at least one of an SSB or a CSI-RS from a cell, wherein the reference signals are transmitted using multiple TRPs.

In aspect 29, the method of any of aspects 25-28 further includes that the at least two first random access messages are time division multiplexed on the number of beams transmitting beams or frequency division multiplexed on the number of transmitting beams.

In aspect 30, the method of any of aspects 25-29 further includes that the base station receives a first preamble using a first beam from a first random access beam pool and receives a second preamble using a second beam from a second random access beam pool, wherein the first preamble is received using a first receive beam selected from a first random access resource candidate beam pool at a cell, and wherein the second preamble is received using a second receive beam selected from a second random access resource candidate beam pool at the cell, the first receive beam being for a first TRP of the cell, and the second receive beam being for a second TRP of the cell.

In aspect 31, the method of aspect 30 further includes transmitting, to the UE, an indication of a random access beam pool index per reference signal from a cell.

Aspect 32 is a device including one or more processors and one or more memories in electronic communication with the one or more processors storing instructions executable by the one or more processors to cause the device to implement a method as in any of aspects 25-31.

Aspect 33 is a system or apparatus including means for implementing a method or realizing an apparatus as in any of aspects 25-31.

Aspect 34 is a non-transitory computer readable medium storing instructions executable by one or more processors to cause the one or more processors to implement a method as in any of aspects 25-31.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    transmitting at least two first random access messages (Msg 1) directed to different transmission reception points (TRPs) of multiple TRPs for at least one cell using different resources for the multiple TRPs, the different resources including one or more of different time resources or different frequency resources for the multiple TRPs; and
    monitoring, after transmitting the at least two first random access messages, for at least two second random access messages (Msg 2) from the multiple TRPs of the at least one cell based on the different time resources or the different frequency resources for the multiple TRPs.

2. The method of claim 1, wherein the different resources further comprise different spatial resources.

3. The method of claim 1, wherein the different resources for the multiple TRPs comprise at least the different frequency resources.

4. The method of claim 1, wherein the different resources for the multiple TRPs comprise at least the different time resources.

5. The method of claim 1, further comprising:
    receiving a configuration for random access with the at least one cell having the multiple TRPs.

6. The method of claim 1, wherein the at least one cell comprises a primary cell (PCell) for the UE, a secondary cell (SCell) for the UE, or a primary secondary cell (PSCell) for the UE.

7. The method of claim 1, wherein each first random access message includes a preamble, and wherein the UE transmits the at least two first random access messages using a number of transmitting beams associated with reference signals corresponding to a number of receiving beams from the at least one cell during a corresponding number of allocated random access occasions, with each random access occasion being associated with a reference signal for receiving the preamble.

8. The method of claim 7, wherein the reference signals include at least one of a synchronization signal block (SSB) or a channel state information-reference signal (CSI-RS) from the at least one cell.

9. The method of claim 7, wherein the reference signals are received from the multiple TRPs for a single cell.

10. The method of claim 7, wherein the at least two first random access messages are time division multiplexed on the number of transmitting beams.

11. The method of claim 7, wherein the at least two first random access messages are frequency division multiplexed on the number of transmitting beams.

12. The method of claim 7, wherein the UE transmits a first preamble for reception by a first receive beam selected from a first random access resource candidate beam pool for a cell and transmits a second preamble for reception by a second receive beam selected from a second random access resource candidate beam pool for the cell, the first receive beam being for a first transmission reception point (TRP) of the cell, and the second receive beam being for a second TRP of the cell.

13. The method of claim 12, further comprising:
    receiving, from a base station, an indication of a random access beam pool index per reference signal from the cell.

14. The method of claim 1, further comprising:
    receiving, from a base station, an indication of a beam sweep for the at least two second random access messages for the UE.

15. The method of claim 1, wherein the UE receives a control channel of the at least two second random access messages that is transmitted with a number of beams based on multiple reference signals, wherein the number of beams are transmitted from the multiple TRPs.

16. The method of claim 1, wherein the UE receives a control channel of the at least two second random access messages that is transmitted with a single beam per random access beam pool, wherein the UE receives an indication of each random access beam pool in radio resource control (RRC) signaling, wherein the UE receives a configuration of a reference signal index per random access beam pool, and wherein multiple random access beam pools are for the multiple TRPs.

17. The method of claim 1, wherein the UE monitors for multiple physical downlink shared channels (PDSCHs) for the at least two second random access messages from the at least one cell.

18. The method of claim 17, wherein the UE monitors for each PDSCH based on a same beam as a control channel scheduling a respective PDSCH.

19. The method of claim 17, wherein the UE monitors for a PDSCH from the multiple PDSCHs based on a different beam than a corresponding control channel scheduling the PDSCH, wherein the different beam is configured by DCI in the corresponding control channel.

20. The method of claim 17, further comprising:
determining a resource allocation for a first PDSCH of the multiple PDSCHs from a control channel for a second PDSCH, wherein each control channel for the at least two second random access messages carries resource allocation information for the multiple PDSCHs for the at least two second random access messages.

21. The method of claim 17, wherein each of the multiple PDSCHs carry uplink grant information for a plurality of third random access messages.

22. An apparatus for wireless communication at a user equipment (UE), comprising:
a memory; and
at least one processor coupled to the memory and configured to:
transmit at least two first random access messages (Msg 1) directed to different transmission reception points (TRPs) of multiple TRPs for at least one cell using different resources for the multiple TRPs, the different resources including one or more of different time resources or different frequency resources for the multiple TRPs; and
monitor, after transmission of the at least two first random access messages, for at least two second random access messages (Msg 2) from the multiple TRPs of the at least one cell based on the different time resources or the different frequency resources for the multiple TRPs.

23. A method of wireless communication at a base station, comprising:
receiving, from a user equipment (UE), at least two first random access messages (Msg 1) directed to different transmission reception points (TRPs) of multiple TRPs for at least one cell based on different resources for the multiple TRPs, the different resources including one or more of different time resources or different frequency resources for the multiple TRPs; and
transmitting, to the UE and after receiving the at least two first random access messages, at least two second random access messages (Msg 2) from the multiple TRPs of the at least one cell based on the different time resources or the different frequency resources for the multiple TRPs.

24. The method of claim 23, wherein the different resources further comprise different spatial resources in addition to the one or more of the different frequency resources, or the different time resources.

25. The method of claim 23, wherein each of the at least two first random access messages include a preamble, and wherein the base station receives the at least two first random access messages from the UE using a number of reception beams for reference signals corresponding to a number of transmitting beams from the UE during a corresponding number of allocated random access occasions, each random access occasion being associated with a reference signal.

26. The method of claim 25, wherein the reference signals include at least one of a synchronization signal block (SSB) or a channel state information-reference signal (CSI-RS) from a cell, wherein the reference signals are transmitted using the multiple TRPs.

27. The method of claim 25, wherein the at least two first random access messages are time division multiplexed on the number of transmitting beams or frequency division multiplexed on the number of transmitting beams.

28. The method of claim 25, wherein the base station receives a first preamble using a first beam from a first random access beam pool and receives a second preamble using a second beam from a second random access beam pool,
wherein the first preamble is received using a first receive beam selected from a first random access resource candidate beam pool at a cell, and
wherein the second preamble is received using a second receive beam selected from a second random access resource candidate beam pool at the cell, the first receive beam being for a first transmission reception point (TRP) of the cell, and the second receive beam being for a second TRP of the cell.

29. The method of claim 28, further comprising:
transmitting, to the UE, an indication of a random access beam pool index per reference signal from the at least one cell.

30. An apparatus for wireless communication at a base station, comprising:
a memory; and
at least one processor coupled to the memory and configured to:
receive, from a user equipment (UE), at least two first random access messages (Msg 1) directed to different transmission reception points (TRPs) of multiple TRPs for of at least one cell based on different resources for the multiple TRPs, the different resources including one or more of different time resources or different frequency resources for the multiple TRPs; and
transmit, to the UE and after reception of the at least two first random access messages, at least two second random access messages (Msg 2) from the multiple TRPs of the at least one cell based on the different time resources or the different frequency resources for the multiple TRPs.

* * * * *